(12) United States Patent
Tamai et al.

(10) Patent No.: US 8,444,516 B2
(45) Date of Patent: May 21, 2013

(54) MULTI-SPEED DRIVE UNIT

(75) Inventors: Goro Tamai, West Bloomfield, MI (US); Dumitru Puiu, Sterling Heights, MI (US); Scott A. Miller, Northville, MI (US); Dale E. Martin, Novi, MI (US); Travis J. Miller, Washington, IL (US)

(73) Assignee: Chrysler Group LLC, Auburn Hills, MI (US)

( * ) Notice: Subject to any disclaimer, the term of this patent is extended or adjusted under 35 U.S.C. 154(b) by 286 days.

(21) Appl. No.: 12/882,936

(22) Filed: Sep. 15, 2010

(65) Prior Publication Data

US 2012/0065015 A1     Mar. 15, 2012

(51) Int. Cl.
*F16H 3/72* (2006.01)
(52) U.S. Cl.
USPC .............................................................. 475/5
(58) Field of Classification Search
None
See application file for complete search history.

(56) References Cited

U.S. PATENT DOCUMENTS

| | | | |
|---|---|---|---|
| 5,845,731 A | 12/1998 | Buglione et al. | |
| 5,931,757 A | 8/1999 | Schmidt | |
| 6,090,005 A | 7/2000 | Schmidt et al. | |
| 6,344,008 B1 | 2/2002 | Nagano et al. | |
| 6,478,705 B1 | 11/2002 | Holmes et al. | |
| 6,527,659 B1 | 3/2003 | Klemen et al. | |
| 6,862,887 B2 | 3/2005 | Noreikat et al. | |
| 6,893,373 B2 | 5/2005 | Kawamoto et al. | |
| 7,192,373 B2 * | 3/2007 | Bucknor et al. | 475/5 |
| 7,217,211 B2 | 5/2007 | Klemen et al. | |
| 7,252,619 B2 * | 8/2007 | Tabata et al. | 477/3 |
| 7,261,657 B2 * | 8/2007 | Bucknor et al. | 475/5 |
| 7,261,660 B2 | 8/2007 | Sowul et al. | |
| 7,278,941 B2 * | 10/2007 | Holmes et al. | 475/5 |
| 7,282,004 B2 * | 10/2007 | Raghavan et al. | 475/5 |
| 7,367,910 B2 | 5/2008 | Schmidt | |
| 7,374,506 B2 * | 5/2008 | Bucknor et al. | 475/5 |
| 7,396,305 B2 * | 7/2008 | Raghavan et al. | 475/5 |
| 7,503,872 B2 * | 3/2009 | Tabata et al. | 477/5 |
| 7,632,201 B2 | 12/2009 | Takami et al. | |
| 7,678,005 B2 | 3/2010 | Tuckfield | |
| 7,749,131 B2 | 7/2010 | Imamura et al. | |
| 7,794,357 B2 * | 9/2010 | Imamura et al. | 477/4 |
| 7,942,776 B2 * | 5/2011 | Conlon | 475/5 |
| 8,287,412 B2 * | 10/2012 | Lee et al. | 475/5 |
| 2007/0099738 A1 | 5/2007 | Holmes | |
| 2007/0275814 A1 | 11/2007 | Bucknor | |
| 2008/0103002 A1 | 5/2008 | Holmes | |
| 2009/0011887 A1 | 1/2009 | Komada et al. | |
| 2009/0124451 A1 | 5/2009 | Rask | |
| 2009/0170649 A1 | 7/2009 | Murakami et al. | |
| 2009/0176610 A1 | 7/2009 | Conlon | |
| 2010/0018788 A1 | 1/2010 | Katsuta | |
| 2010/0180722 A1 | 7/2010 | Sasaki | |
| 2010/0203996 A1 | 8/2010 | Kawai et al. | |
| 2012/0065014 A1 * | 3/2012 | Puiu et al. | 475/5 |
| 2012/0065016 A1 * | 3/2012 | Tamai et al. | 475/5 |

FOREIGN PATENT DOCUMENTS

DE         3424646 A1    1/1985

* cited by examiner

*Primary Examiner* — Dirk Wright
(74) *Attorney, Agent, or Firm* — Frederick A. Krieger

(57) ABSTRACT

A compound-input is provided for an electrically variable transmission for a motor vehicle. The compound-input electrically variable transmission has improved input gear ratios that allow the vehicle engine to be operated in its desired efficiency and/or performance range during both city and highway vehicle operation. Further, the multi-speed input electrically variable transmission provides an input brake without the need for a dedicated input brake clutch or braking mechanism and incorporates a reverse gear for reverse operation.

6 Claims, 14 Drawing Sheets

| | C1 | C2 | NOTES |
|---|---|---|---|
| HEV W/ ENGINE ON, FIRST INPUT GEAR RATIO | ON | OFF | FIRST INPUT GEAR RATIO OF MSI-EVT |
| HEV W/ ENGINE ON, SECOND INPUT GEAR RATIO | OFF | ON | SECOND INPUT GEAR RATIO OF MSI-EVT |
| HEV IN EV 1 | ON | ON | EVT WITH BOTH MOT-A & MOT-B EV DRIVE |
| HEV IN EV 2a | ON | OFF | EV AS CONVENTIONAL INPUT-SPLIT EVT |
| HEV IN EV 2b | OFF | ON | EV AS CONVENTIONAL INPUT-SPLIT EVT |

FIG. 4

| | C1 | C2 | C3 | C4 | NOTES |
|---|---|---|---|---|---|
| HEV 1 | ON | OFF | OFF | ON | FIRST INPUT GEAR RATIO OF MSI-EVT |
| HEV 2 | OFF | ON | OFF | ON | SECOND INPUT GEAR RATIO OF MSI-EVT |
| ReEV AS BEV 1 | OFF | OFF | OFF | OFF | 1spd BEV |
| ReEV AS BEV 2 | ON | ON | OFF | ON | EVT WITH BOTH MOT-A & MOT-B EV DRIVE |
| ReEV AS BEV 3a | ON | OFF | OFF | ON | EV AS CONVENTIONAL INPUT-SPLIT EVT |
| ReEV AS BEV 3b | OFF | ON | OFF | ON | EV AS CONVENTIONAL INPUT-SPLIT EVT |
| ReEV AS SERIES 1 | ON | OFF | ON | OFF | SERIES HYBRID MODE, FIRST INPUT GEAR RATIO |
| ReEV AS SERIES 2 | OFF | ON | ON | OFF | SERIES HYBRID MODE, SECOND INPUT GEAR RATIO |
| ReEV AS EVT 1 | ON | OFF | OFF | ON | HEV DRIVING, FIRST INPUT GEAR RATIO |
| ReEV AS EVT 2 | OFF | ON | OFF | ON | HEV DRIVING, SECOND INPUT GEAR RATIO |
| BEV | DEL | DEL | DEL | DEL | ADDITIONAL FINAL DRIVE GEAR SET |

FIG. 8

MULTI-SPEED DRIVE UNIT

FIELD OF THE INVENTION

Embodiments disclosed herein relate generally to a transmission for a motor vehicle, and more particularly, to an electrically variable transmission having a multi-speed input.

BACKGROUND OF THE INVENTION

A multi-mode electrically variable transmission is an advantageous new transmission design that has the ability to reduce engine and electric motor losses at low as well as high vehicle speeds. However, depending on the implementation of the mode-changing mechanism, a multi-mode electrically variable transmission has potential disadvantages. For example a multi-mode electrically variable transmission ("multi-mode EVT") may experience higher transmission spin losses due to clutch drag and multiple planetary gear set friction. Further, the gearing range within some multi-mode EVTs may limit the electric vehicle ("EV") drive capabilities.

A simplified illustration of "mechanical point chasing" in FIG. 1 shows the rotations per minute ("RPM") of a first electric motor A, second electric motor B, and engine of a typical prior art single-mode electrically variable transmission plotted against the rotations per minute of the final drive. As can be seen in FIG. 1, the engine RPM ("ENGINE") remain constant as the final drive RPM increases until the final drive RPM reaches N1. Meanwhile, the RPM of electric motor B ("MOT B") increases proportionally with the final drive RPM. In contrast to electric motor B, the RPM of electric motor A ("MOT A") decreases proportionally with the final drive RPM and is equal to zero at a final drive RPM of N1. Once the RPM of electric motor A reaches small negative values (0 rpm used in this simplified example), any further decrease in RPM of electric motor A results in correspondingly increased system losses. Thus, typical single-mode EVTs will not allow electric motor A to operate at (very) negative RPM when the engine is running. The rotation speed of the engine must account for the lack of a further decline (into negative) of RPM of motor A above final drive RPM of N1. Thus, at final drive RPM above N1, the engine RPM must increase proportionally with the increase in the final drive speed. An increase in engine RPM likely results in the engine operating out of its optimum fuel efficiency or power range, or both. Thus, it becomes necessary to design the gearing of the EVT to compromise between adequate highway (i.e., high-speed) and city (i.e., low-speed) performance and efficiency. Thus, a desirable EVT better optimizes engine operation and electric motor losses, while still providing satisfactory city and highway performance and EV functionality, while also being compactly implementable with a low loss mode-change mechanism.

Some EVTs include an input brake which locks the input shaft of the EVT to prevent the input shaft from rotating. The input brake enables both electric motors within the EVT to provide propulsive force when operating in an EV mode. In addition, the input brake improves the drive and regenerative braking efficiency of the EVT by reducing the total system loss by minimizing the sum of the electric motors and engine losses for a given drive system configuration. However, typical prior art EVTs rely upon a separate clutch and/or brake mechanism apart from the EVT to provide input brake functionality. The addition of this separate clutch and/or brake mechanism adds both cost and drag to the EVT.

In a typical prior art EVT, electric motors are utilized to start the fossil fuel powered engine of the vehicle. Thus, the gear ratio between the electric motors, the size of the electric motors of the EVT, and the size of the batteries that power the EVT must be sufficient to provide adequate starting force for the engine even in the worst starting conditions. Thus, compromises often must be made within the EVT to ensure that the motors have adequate torque to start the engine. As a result, the gear ratio between the electric motors, the size of the electric motors, and the size of the batteries that power the EVT may not be ideal for certain vehicle operation. Larger electric motors and batteries may be necessary to start the vehicle engine, thereby adding weight and cost to the EVT.

An EVT generally has limited reverse gear capabilities and relies solely upon one of its electric motors to provide reverse propulsion. This is problematic during situations in which electric battery power or electric motor torque may be limited such as in extremely hot or cold climates. If electric power fails or provides inadequate propulsive force, the vehicle is simply unable to move in reverse. Thus, a desirable EVT harnesses the propulsive force of the engine for reverse gear operation or uses both electric motors of the EVT to provide reverse propulsion if battery power is adequate.

It is, therefore, desirable to provide an EVT that keeps the engine operating within its efficiency and/or power range while also providing satisfactory city and highway performance. It is, therefore, also desirable to provide an EVT with an integrated input brake. It is also desirable to provide an EVT with sufficient torque to start the engine of the vehicle without making other vehicle performance and cost compromises. In addition, it is desirable to provide an EVT in which the engine may provide propulsive force for reverse gear operation or both electric motors of the EVT can be used for reverse gear operation.

BRIEF SUMMARY OF THE INVENTION

In an example embodiment, a electrically variable transmission having a transmission input shaft and an electrically variable transmission input shaft is provided. The transmission input shaft is selectively coupled to the electrically variable transmission input shaft to provide a first input gear ratio, and the transmission input shaft is selectively coupled to the electrically variable transmission input shaft to provide a second input gear ratio.

In another example embodiment, a transmission having a transmission input shaft and a first planetary gear set is provided. The first planetary gear set includes a first sun gear, at least two first pinion gears continuously meshed with the first sun gear, and a first ring gear continuously meshed with the at least two first pinion gears. The at least two first pinion gears are coupled to a first carrier. The transmission also includes a first electric motor coupled to the first sun gear, a second electric motor coupled to the first ring gear, and first and second clutch mechanisms coupled to the transmission input shaft. The first clutch mechanism selectively couples the transmission input shaft to the first carrier to provide a first input gear ratio and the second clutch mechanism selectively couples the transmission input shaft to the first carrier to provide a second input gear ratio.

In another example embodiment, a transmission having a first planetary gear set is provided. The first planetary gear set includes a first sun gear, at least two first pinion gears continuously meshed with the first sun gear, and a first ring gear continuously meshed with the at least two first pinion gears. The transmission also includes a first electric motor coupled to the first sun gear, a second electric motor coupled to the first ring gear, and a second planetary gear set. The second planetary gear set includes a second sun gear, at least two second pinion gears continuously meshed with the second sun gear, and a second ring gear continuously meshed with the at least two second pinion gears. The first planetary gear set is coupled to the second planetary gear set. The transmission also includes first and second clutch mechanisms coupled to second planetary gear set. The first clutch mechanism selectively couples the second planetary gear set to provide a first input gear ratio to the first planetary gear set and the second clutch mechanism selectively couples the second planetary gear set to provide a second input gear ratio to the first planetary gear set.

One advantage of the disclosed embodiments is that an improved planetary gear set configuration is provided for the compound-input EVT. The compound-input EVT may be operated in its desired efficiency and/or performance range more frequently. Further, the transmission allows for more efficient and powerful electric vehicle operation. The compound-input EVT is provided with a multi-speed input device that allows for improved engine starting in difficult starting conditions. The compound-input EVT is capable of hybrid electric vehicle, plug-in hybrid electric vehicle, range-extended electric vehicle and pure battery electric vehicle operation.

BRIEF DESCRIPTION OF THE DRAWINGS

The technology is illustrated and described herein with reference to the various drawings, in which like reference numbers denote like method steps and/or system components, and in which:

FIG. 4 is a table listing the operating modes and corresponding clutch activation states of the compound-input electrically variable transmission of FIG. 2;

FIG. 8 is a table listing the operating modes and corresponding clutch activation states of the compound-input electrically variable transmission of FIG. 7;

DETAILED DESCRIPTION OF THE PREFERRED EMBODIMENTS

Figure 2:
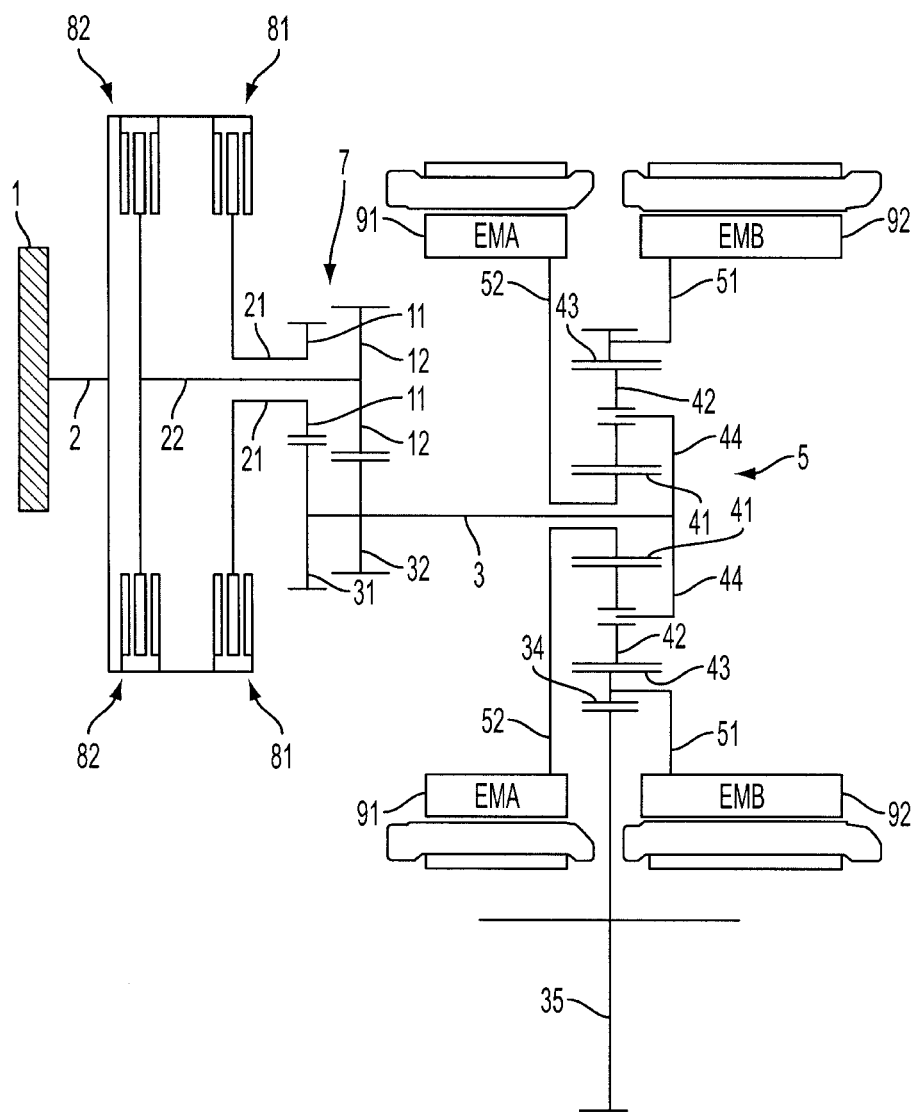
FIG. 2 illustrates an example compound-input electrically variable transmission having a multi-speed gearing mechanism incorporated between an engine and a carrier of an input-split planetary gear set according to an embodiment disclosed herein.

FIG. 2 illustrates an example compound-input electrically variable transmission ("CI-EVT") having a multi-speed gearing mechanism 7 incorporated between an engine 1 and a carrier 44 of an input-split planetary gear set 5 according to an embodiment disclosed herein. The CI-EVT includes a transmission input shaft 2 coupled to the vehicle engine 1 or other propulsive source ("engine"). The transmission input shaft 2 is also coupled to a first clutch mechanism 81 and a second clutch mechanism 82. The first clutch mechanism 81 is selectively coupled to a first input layshaft 21 that is concentric with the transmission input shaft 2. The second clutch mechanism 82 is selectively coupled to a second input layshaft 22 that is concentric with the transmission input shaft 2 and first input layshaft 21. The first input layshaft 21 is non-rotatably coupled to a first driver gear 11 and the second input layshaft 22 is non-rotatably coupled to a second driver gear 12. The transmission input shaft 2, first input layshaft 21 and first driver gear 11 may be coupled together in synchronous rotation by activating the first clutch mechanism 81 and deactivating the second clutch mechanism 82. The transmission input shaft 2, second input layshaft 22 and second driver gear 12 may be coupled together in synchronous rotation by activating the second clutch mechanism 82 and deactivating the first clutch mechanism 81. The CI-EVT also includes a first driven gear 31 and a second driven gear 32 non-rotatably mounted on an EVT input shaft 3. The first driven gear 31 is continuously meshed with the first driver gear 11 and the second driven gear 32 is continuously meshed with the second driven gear 12. The gearing ratios of the first driver gear 11/first driven gear 31 ("first input gear ratio") and second driver gear 12/second driven gear 32 ("second input gear ratio") can be selected to be any desired under/overdrive ratio for either gear range.

The carrier 44 is coupled to the EVT input shaft 3. The input-split planetary gear set 5 is a conventional planetary gear set as would be readily understood by one of ordinary skill in the art and includes a sun gear 41, a plurality of pinion gears 42 and a ring gear 43. The pinion gears 42 are rotatably mounted on the carrier 44. Each pinion gear 42 is continuously meshed with the sun gear 41 and the ring gear 43. The sun gear 41 is non-rotatably coupled by a shaft 52 to electric motor A 91 ("EMA"). The ring gear 43 is non-rotatably coupled to electric motor B 92 ("EMB") by a shaft 51. The ring gear 43, shaft 51 and EMB 92 are also non-rotatably coupled to an output gear 34. The output gear 34 is continuously meshed with a final drive output 35 that distributes propulsive force from the CI-EVT.

Figure 1:
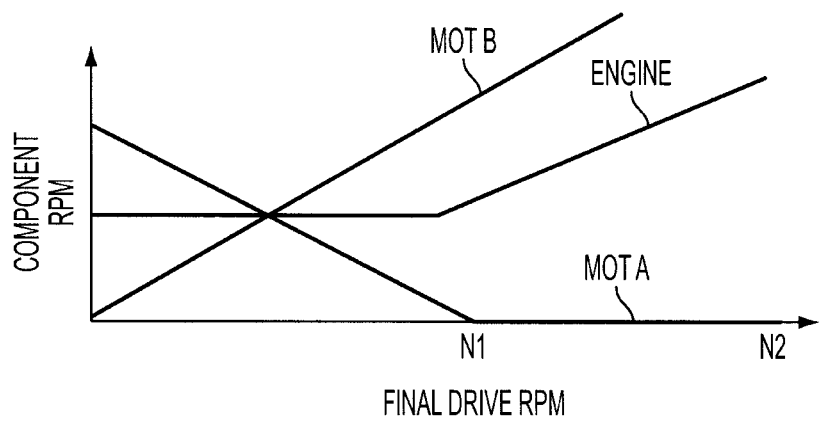
FIG. 1 is a graph showing the rotations per minute of a first electric motor A, second electric motor B, and engine of a typical prior art single-mode electrically variable transmission plotted against the rotations per minute of the final drive.
Figure 3:
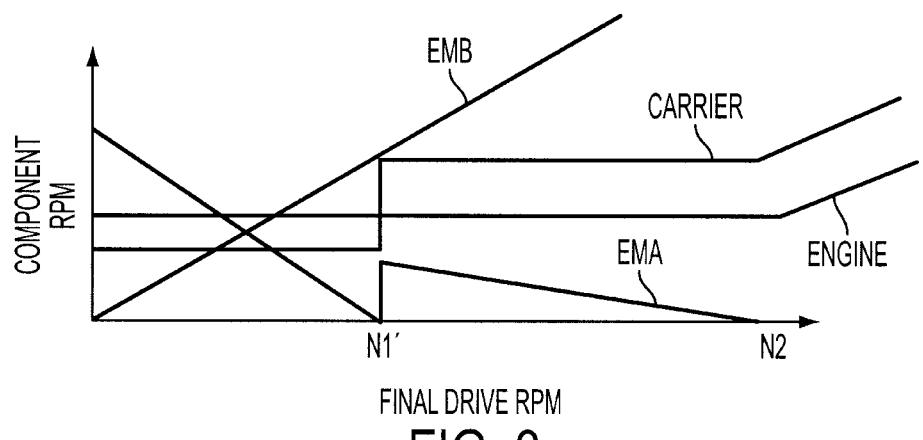
FIG. 3 is a graph showing the rotations per minute of a first electric motor, second electric motor, carrier, and engine of the compound-input electrically variable transmission of FIG. 2 plotted against the output rotations per minute of the final drive.

FIG. 3 is a graph showing the rotations per minute of the first electric motor ("EMA"), second electric motor ("EMB"), carrier, and engine of the compound-input electrically variable transmission of FIG. 2 plotted against the output rotations per minute of the final drive. FIG. 3 shows the operation of the CI-EVT using the first driver gear 11/first driven gear 31 ("first input gear ratio") for final drive RPM less than N1' and using the second driver gear 12/second driven gear 32 ("second input gear ratio") for final drive RPM greater than N1'. At final drive RPM less than N1', the first clutch mechanism 81 is activated and the second clutch mechanism 82 is deactivated causing the CI-EVT to operate using the first input gear ratio. As can be seen in FIG. 3, the engine 1 RPM remains constant as the final drive RPM increases until the final drive RPM reaches N2. Likewise, the RPM of the carrier 44 remains constant between final drive RPM of zero and N1'. The RPM of EMB 92 ("EMB" in FIG. 3) increases proportionally with the final drive RPM. In contrast to EMB 92, the RPM of EMA 91 ("EMA" in FIG. 3) decreases proportionally with the final drive RPM and is equal to zero at a final drive RPM of N1'. However, in contrast to the EVT of FIG. 1, in the CI-EVT of FIG. 3, once the RPM of EMA 91 reaches 0 at N1', the first clutch mechanism 81 is deactivated and the second clutch mechanism 82 is activated. The change in the activation states switches the CI-EVT from operation in the first input gear ratio to operation in the second input gear ratio. The corresponding change in gear ratios causes the RPM of EMA 91 to increase. All the while, the RPM of the engine 1 and EMB 92 remain unchanged. However, the RPM of the carrier 44 is increased at final drive RPM above N1'. The carrier 44 RPM then remain constant at final drive RPM between N1' and N2. At final drive RPM above N1', the RPM of the engine 1 still remains constant while the RPM of EMB 92 continues to increase in proportion to the final drive RPM. Meanwhile, the RPM of EMA 91 decreases in proportion to the final drive RPM. However, because of the switch in gearing that occurred at N1', the RPM of EMA 91 does not reach zero until a final drive speed of N2. At final drive RPM of N2 and greater, the engine 1 RPM begin to increase in order to prevent EMA 91 from operating at negative RPM. Likewise, the RPM of the carrier 44 increase at final drive speeds greater than N2.

FIG. 4 is a table listing the operating modes and corresponding clutch activation states of the compound-input electrically variable transmission of FIG. 2. The first clutch mechanism 81 ("C1") and second clutch mechanism 82 ("C2") may be selectively activated to achieve the different operating states of the CI-EVT. "On" indicates that the clutch has been activated, thereby coupling together all components to which it is attached as described above. "Off" indicates that the clutch has been deactivated, thereby allowing the components to which it is coupled to rotate independent of one another. Referring again to FIGS. 2 and 4, when the CI-EVT is to be operated as a hybrid electric vehicle ("HEV") with a combination of propulsive force from the engine 1 and EMB 92 with EMA 91 generating electrical power in a first input gear ratio ("HEV w/engine on, first input gear ratio" in FIG. 4), the first clutch mechanism 81 is activated and the second clutch mechanism 82 is deactivated. Thus, propulsive force from the engine 1 passes through the transmission input shaft 2, first clutch mechanism 81, first driver gear 11, first driven gear 31, EVT input shaft 3, and into the input-split planetary gear set 5. Propulsive force in the input-split planetary gear set 5 flows to the sun gear 41 and shaft 52 causing EMA 91 to rotate and thereby generate electrical power. Propulsive force in the input-split planetary gear set 5 also flows to the ring gear 43 where the propulsive force is supplemented with propulsive force from EMB 92 via shaft 51. Propulsive force then flows to the output gear 34 and out of the transmission through the final drive output 35. When the CI-EVT is to be operated as a HEV with a combination of propulsive force from the engine 1 and EMB 92 with EMA 91 generating electrical power in a second input gear ratio ("HEV w/engine on, second input gear ratio" in FIG. 4), the second clutch mechanism 82 is activated and the first clutch mechanism 81 is deactivated. Thus, propulsive force from the engine 1 passes through the transmission input shaft 2, second clutch mechanism 82, second driver gear 12, second driven gear 32, EVT input shaft 3, and into the input-split planetary gear set 5. Propulsive force in the input-split planetary gear set 5 flows to the sun gear 41 and shaft 52 causing EMA 91 to rotate and thereby generate electrical power. Propulsive force in the input-split planetary gear set 5 also flows to the ring gear 43 where the propulsive force is supplemented with propulsive force from EMB 92 via shaft 51. Propulsive force then flows to the output gear 34 and out of the transmission through the final drive output 35.

Still referring to FIG. 4, the CI-EVT in a HEV may be operated as a completely electrically powered transmission ("EV"). When the CI-EVT in a HEV is to be operated in an EV mode with propulsive force from both EMA 91 and EMB 92 ("HEV in EV 1"), the first clutch mechanism 81 and second clutch mechanism 82 are both activated simultaneously. Activating the first and second clutch mechanisms 81, 82 simultaneously effectively locks the EVT input shaft 3 and, correspondingly, the carrier 44 in place and prevents both from rotating. EMA 91 provides propulsive force to the sun gear 41 via shaft 52, which causes the ring gear 43 to rotate. EMB 92 supplements the propulsive force provided to the ring gear 43 by EMA 91 via shaft 51. The propulsive force is transferred to the output gear 34, which then powers the final drive output 35. Alternatively, the CI-EVT in a HEV may be operated in an EV mode with propulsive force provided only by EMB 92. For operation in this mode, the first clutch mechanism 81 is activated and the second clutch mechanism 82 is deactivated ("HEV in EV 2a" in FIG. 4) or the first clutch mechanism 81 is deactivated and the second clutch mechanism 82 is activated ("HEV in EV 2b" in FIG. 4). In this mode of operation, EMB 92 provides propulsive force to the shaft 51 which then powers the output gear 34. The output gear 34 powers the final drive output 35. The rotation of EMB 92 also causes the ring gear 43 of the input-split planetary gear set 5 to rotate via shaft 51. The rotation of the input-split planetary gear set 5 causes EMA 91 to rotate. When EMB 92 is providing propulsive force in this mode, EMA 91 is operated in a speed control mode in order to prevent the EVT input shaft 3, transmission input shaft 2 and engine 1 from rotating.

Figure 5:
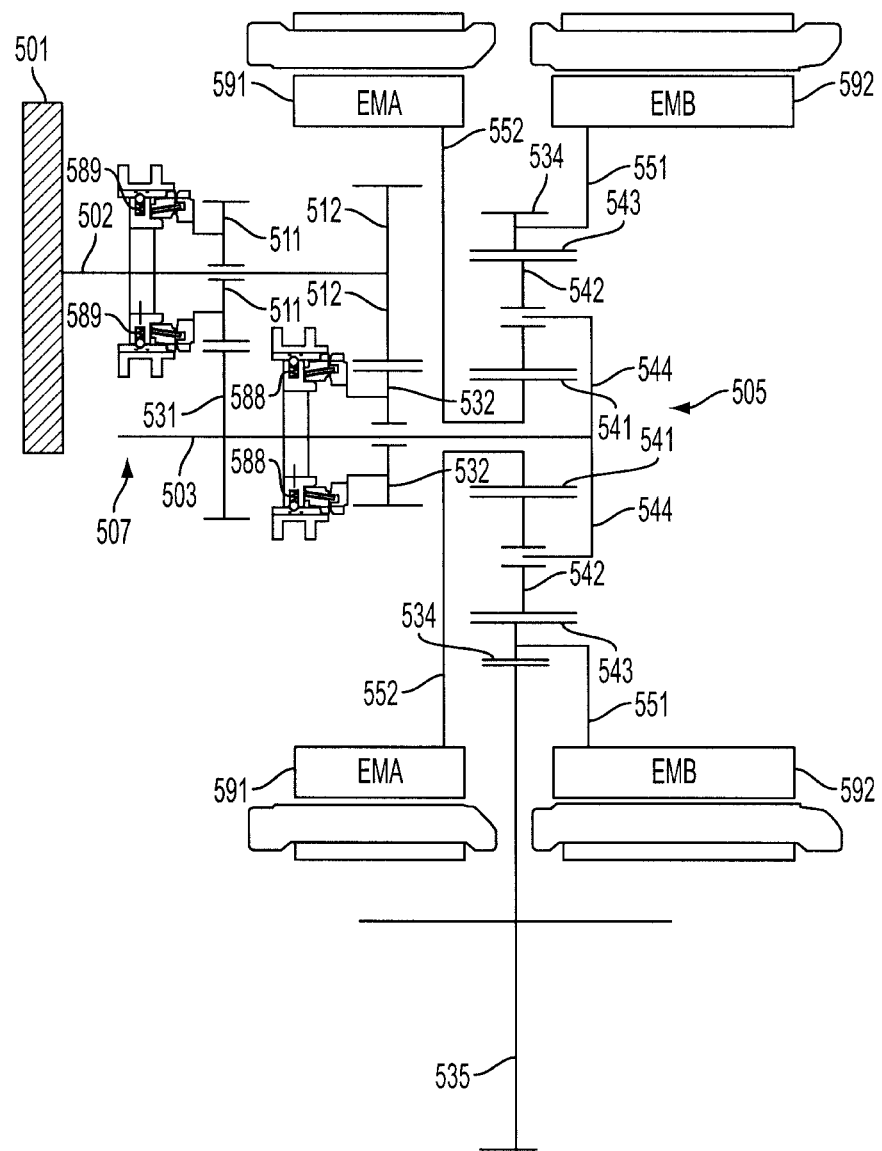
FIG. 5 illustrates an example compound-input electrically variable transmission having a multi-speed gearing mechanism incorporated between an engine and a carrier of an input-split planetary gear set according to another embodiment disclosed herein.

FIG. 5 illustrates an example compound-input electrically variable transmission ("CI-EVT") having a multi-speed gearing mechanism 507 incorporated between an engine 501 and a carrier 544 of an input-split planetary gear set 505 according to another embodiment disclosed herein. The CI-EVT includes a transmission input shaft 502 connected to the engine 501. A first driver gear 511 is rotatably coupled to the transmission input shaft 502 and a second driver gear 512 is non-rotatably coupled to the transmission input shaft 502. The transmission input shaft 502 is also non-rotatably coupled to a first synchronizer mechanism 589. The first synchronizer mechanism 589 is longitudinally movable along the transmission input shaft 502 and may be moved into contact with the first driver gear 511, thereby, locking the first driver gear 511 to the transmission input shaft 502. The CI-EVT also includes an EVT input shaft 503 parallel to the transmission input shaft 502. A first driven gear 531 is non-rotatably coupled to the EVT input shaft 503 and a second driven gear 532 rotatably coupled to the EVT input shaft 503. The first driven gear 531 is continuously meshed with the first driver gear 511 and the second driven gear 532 is continuously meshed with the second driver gear 512. The gearing ratios of the first driver gear 511/first driven gear 531 ("first input gear ratio") and second driver gear 512/second driven gear 532 ("second input gear ratio") can be selected to any desired under/overdrive ratio for each gear range. A second synchronizer mechanism 588 is non-rotatably coupled to the EVT input shaft 503. The second synchronizer mechanism 588 is longitudinally movable along the EVT input shaft 503 and may be moved into contact with the second driven gear 532, thereby locking the second driven gear 532 to the EVT input shaft 503.

The EVT input shaft 503 is also coupled to the carrier 544. The input-split planetary gear set 505 is a conventional planetary gear set as would be readily understood by one of ordinary skill in the art and includes a sun gear 541, a plurality of pinion gears 542 and a ring gear 543. The pinion gears 542 are rotatably mounted on the carrier 544. Each pinion gear 542 is continuously meshed with the sun gear 541 and the ring gear 543. The sun gear 541 is non-rotatably coupled by a shaft 552 to electric motor A 591 ("EMA"). The ring gear 543 is non-rotatably coupled to electric motor B 592 ("EMB") by a shaft 551. The ring gear 543, shaft 551 and EMB 592 are also non-rotatably coupled to an output gear 534. The output gear 534 is continuously meshed a final drive output 535 that distributes propulsive force from the CI-EVT.

The multi-speed gearing mechanism 507 of the CI-EVT of FIG. 5 may be configured for operation in several different modes. For operation of the multi-speed gearing mechanism 507 in a first gear ratio ("HEV w/engine on, first input gear ratio" and "HEV in EV 2a" in FIG. 4), the first synchronizer mechanism 589 is moved longitudinally along the transmission input shaft 502 and into contact with the first driver gear 511, thereby non-rotatably coupling the first driver gear 511 to the transmission input shaft 502. At the same time, the second synchronizer mechanism 588 is kept out of contact with the second driven gear 532. Thus, the transmission input shaft 502 is non-rotatably coupled to the first synchronizer mechanism 589, first driver gear 511, first driven gear 531, EVT input shaft 503 and carrier 544. For operation of the multi-speed gearing mechanism 507 in a second gear ratio ("HEV w/engine on, second input gear ratio" and "HEV in EV 2b" in FIG. 4), the second synchronizer mechanism 588 is moved longitudinally along the EVT input shaft 503 and into contact with the second driven gear 532, thereby non-rotatably coupling the second driven gear 532 to the EVT input shaft 503. At the same time, the first synchronizer mechanism 589 is kept out of contact with the first driver gear 511. Thus, the transmission input shaft 502 is non-rotatably coupled to the second driver gear 512, second driven gear 532, second synchronizer mechanism 588, EVT input shaft 503 and carrier 544. For operation of the multi-speed gearing mechanism 507 as an input brake ("HEV in EV1" in FIG. 4) in which the carrier 544 and transmission input shaft 502 are non-rotatably locked in place, the first synchronizer mechanism 589 is moved into contact with the first driver gear 511 and the second synchronizer mechanism 588 is moved into contact with the second driven gear 532.

Figure 6:
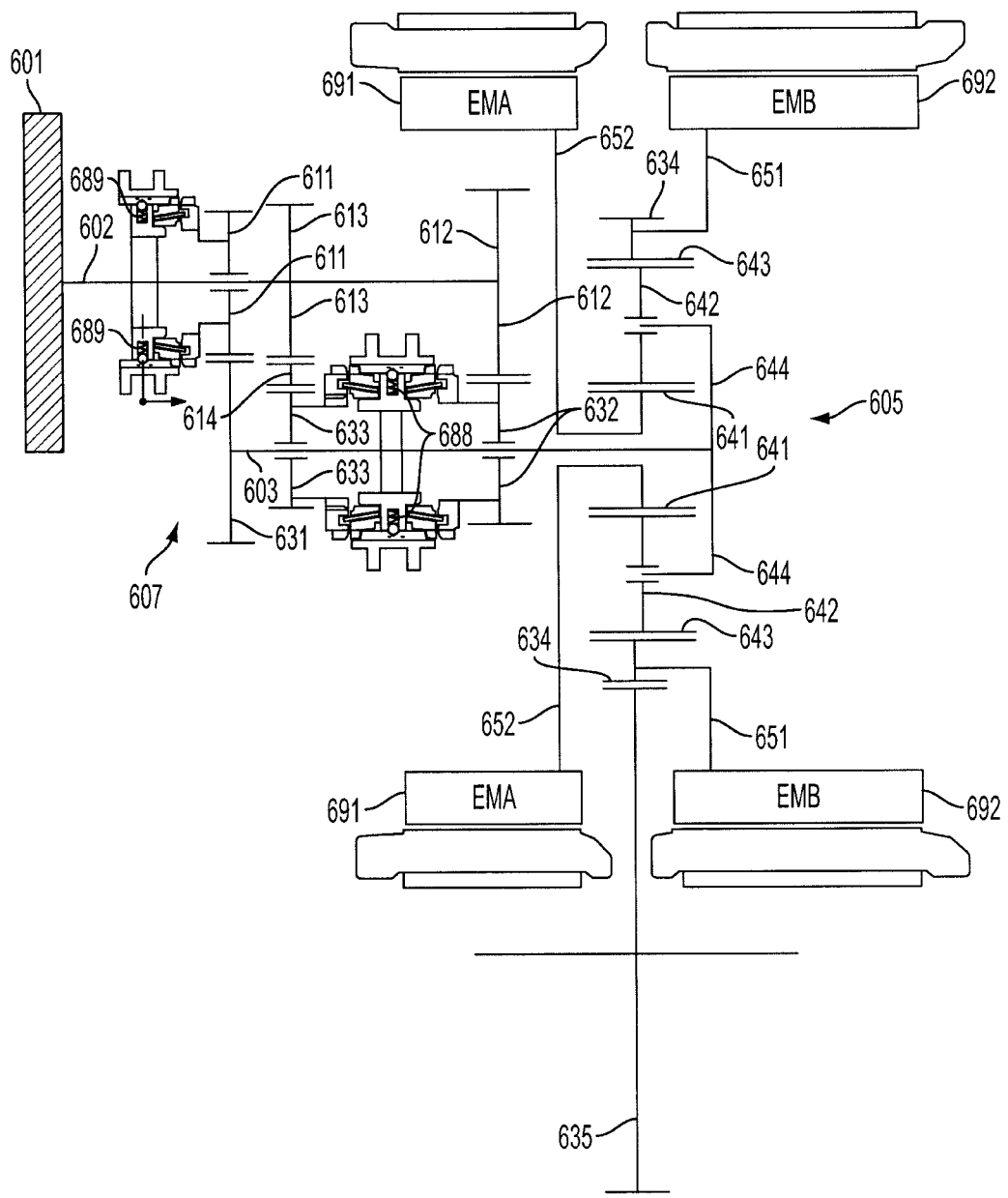
FIG. 6 illustrates an example compound-input electrically variable transmission having a multi-speed gearing mechanism incorporated between an engine and a carrier of an input-split planetary gear set according to another embodiment disclosed herein.

FIG. 6 illustrates an example compound-input electrically variable transmission ("CI-EVT") having a multi-speed gearing mechanism 607 incorporated between an engine 601 and a carrier 644 of an input-split planetary gear set 605 according to another embodiment disclosed herein. The CI-EVT includes a transmission input shaft 602 connected to engine 601. A first driver gear 611 is rotatably coupled to the transmission input shaft 602 and a second driver gear 612 is non-rotatably coupled to the transmission input shaft 602. A reverse driver gear 613 is also non-rotatably coupled to the transmission input shaft 602. The transmission input shaft 602 is also non-rotatably coupled to a first synchronizer mechanism 689. The first synchronizer mechanism 689 is longitudinally movable along the transmission input shaft 602 and may be moved into contact with the first driver gear 611, thereby non-rotatably locking the first driver gear 611 to the transmission input shaft 602. The CI-EVT also includes an EVT input shaft 603 parallel to the transmission input shaft 602. A first driven gear 631 is non-rotatably coupled to the EVT input shaft 603. A second driven gear 632 and reverse driven gear 633 are rotatably coupled to the EVT input shaft 603. The first driven gear 631 is continuously meshed with the first driver gear 611 and the second driven gear 632 is continuously meshed with the second driver gear 612. The reverse driven gear 633 is continuously meshed with a reverse idler gear 614 that is continuously meshed with the reverse driver gear 613. The gearing ratios of the first driver gear 611/first driven gear 631 ("first input gear ratio"), second driver gear 612/second driven gear 632 ("second input gear ratio") and reverse driver gear 613/reverse driven gear 633 ("reverse/third input gear ratio") can be selected to be any desired under/overdrive ratio for each gear range. A second synchronizer mechanism 688 is non-rotatably coupled to the EVT input shaft 603. The second synchronizer mechanism 688 is longitudinally movable along the EVT input shaft 603 and may be moved into contact with either the second driven gear 632 or reverse driven gear 633. The second synchronizer mechanism 688 non-rotatably locks the second driven gear 632 to the EVT input shaft 603 by contacting the second driven gear 632. The second synchronizer mechanism 688 non-rotatably locks the reverse driven gear 633 to the EVT input shaft 603 by contacting the reverse driven gear 633.

The EVT input shaft 603 is also coupled to the carrier 644. The input-split planetary gear set 605 is a conventional planetary gear set as would be readily understood by one of ordinary skill in the art and includes a sun gear 641, a plurality of pinion gears 642 and a ring gear 643. The pinion gears 642 are rotatably mounted on the carrier 644. Each pinion gear 642 is continuously meshed with the sun gear 641 and ring gear 643. The sun gear 641 is non-rotatably coupled by a shaft 652 to electric motor A 691 ("EMA"). The ring gear 643 is non-rotatably coupled to electric motor B 692 ("EMB") by a shaft 651. The ring gear 643, shaft 651 and EMB 692 are also non-rotatably coupled to an output gear 634. The output gear 634 is continuously meshed a final drive output 635 that distributes propulsive force from the CI-EVT.

The multi-speed gearing mechanism 607 of the CI-EVT of FIG. 6 may be configured for operation in several different modes. For operation of the multi-speed gearing mechanism 607 in a first gear ratio ("HEV w/engine on, first input gear ratio" and "HEV in EV 2a" in FIG. 4), the first synchronizer mechanism 689 is moved longitudinally along the transmission input shaft 602 and into contact with the first driver gear 611, thereby non-rotatably coupling the first driver gear 611 to the transmission input shaft 602. At the same time, the second synchronizer mechanism 688 is kept out of contact with the second driven gear 632 and reverse driven gear 633. Thus, the transmission input shaft 602 is non-rotatably coupled to the first synchronizer mechanism 689, first driver gear 611, first driven gear 631, EVT input shaft 603 and carrier 644. For operation of the multi-speed gearing mechanism 607 in a second gear ratio ("HEV w/engine on, second input gear ratio" and "HEV in EV 2b" in FIG. 4), the second synchronizer mechanism 688 is moved longitudinally along the EVT input shaft 603 and into contact with the second driven gear 632, thereby non-rotatably coupling the second driven gear 632 to the EVT input shaft 603. At the same time, the first synchronizer mechanism 689 is kept out of contact with the first driver gear 611. Thus, the transmission input shaft 602 is non-rotatably coupled to the second driver gear 612, second driven gear 632, second synchronizer mechanism 688, EVT input shaft 603 and carrier 644. For operation of the multi-speed gearing mechanism 607 in reverse, the second synchronizer mechanism 688 is moved longitudinally along the EVT input shaft 603 and into contact with the reverse driven gear 633, thereby non-rotatably coupling the reverse driven gear 633 to the EVT input shaft 603. At the same time, the first synchronizer mechanism 689 is kept out of contact with the first driver gear 611. Thus, the transmission input shaft 602 is non-rotatably coupled to the reverse driver gear 613, reverse idler gear 614, reverse driven gear 633, second synchronizer mechanism 688, EVT input shaft 603 and carrier 644. For operation of the multi-speed gearing mechanism 607 as an input brake ("HEV in EV1" in FIG. 4) in which the carrier 644 and transmission input shaft 602 are non-rotatably locked in place, the first synchronizer mechanism 689 is moved into contact with the first driver gear 611 and the second synchronizer mechanism 688 is moved into contact with the second driven gear 532 or reverse driven gear 533.

Figure 7:
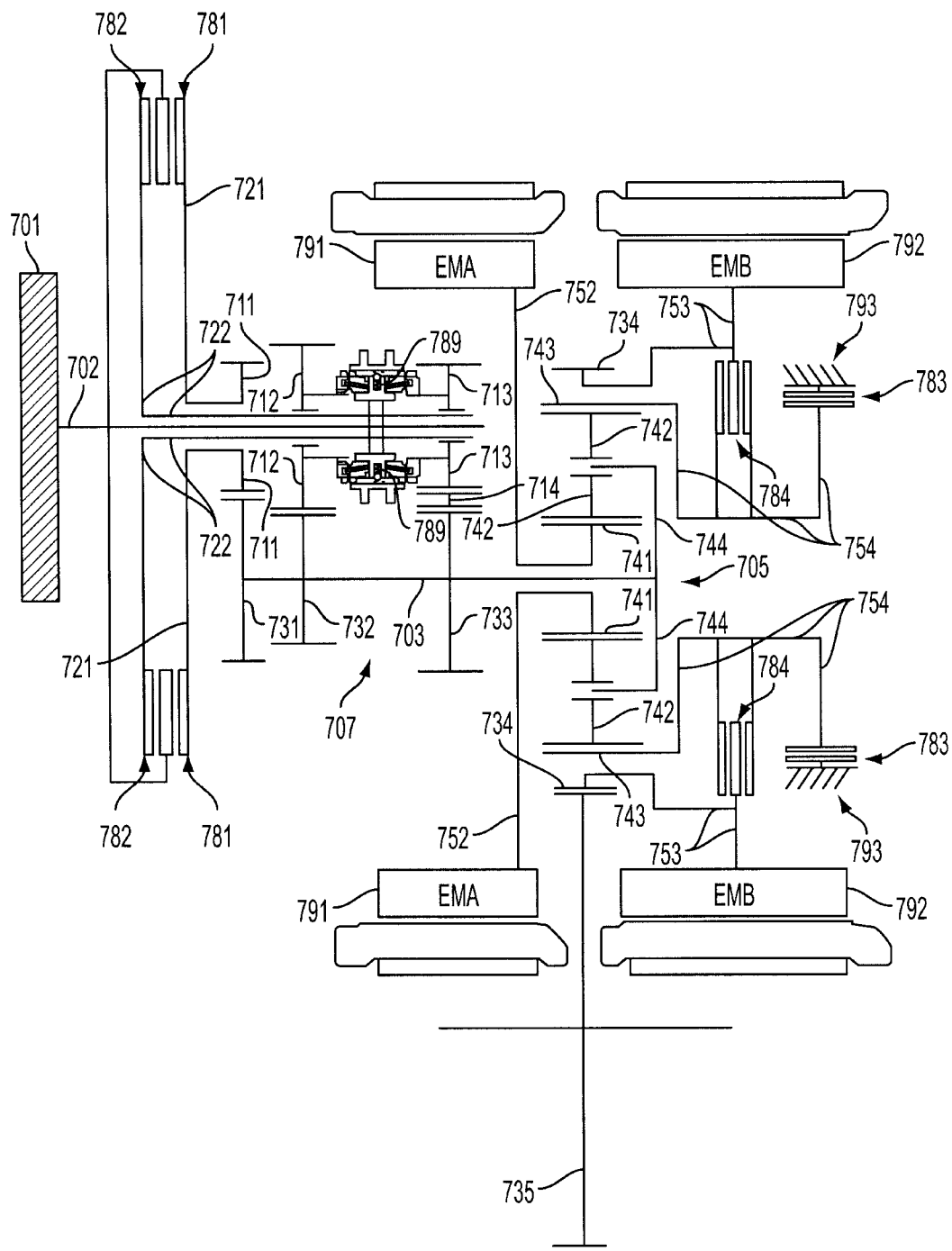
FIG. 7 illustrates an example compound-input electrically variable transmission having a multi-speed gearing mechanism incorporated between an engine and a carrier of an input-split planetary gear set according to another embodiment disclosed herein.

FIG. 7 illustrates an example compound-input electrically variable transmission ("CI-EVT") having a multi-speed gearing mechanism 707 incorporated between an engine 701 and a carrier 744 of an input-split planetary gear set 705 according to another embodiment disclosed herein. The CI-EVT includes a transmission input shaft 702 connected to engine 701. The transmission input shaft 702 is also coupled to a first clutch mechanism 781 and a second clutch mechanism 782. The first clutch mechanism 781 is selectively coupled to a first input layshaft 721 that is concentric with the transmission input shaft 702. The second clutch mechanism 782 is selectively coupled to a second input layshaft 722 that is concentric with the transmission input shaft 702 and first input layshaft 721. The first input layshaft 721 is non-rotatably coupled to a first driver gear 711. The second input layshaft 722 is rotatably coupled to a second driver gear 712 and a reverse driver gear 713. A first synchronizer mechanism 789 is non-rotatably coupled to the second input layshaft 722. The first synchronizer mechanism 789 is longitudinally movable along the second input layshaft and may be moved into contact with either the second driver gear 712 or reverse driver gear 713. The first synchronizer mechanism 789 non-rotatably locks the second driver gear 712 to the second input layshaft 722 by contacting the second driver gear 712. The first synchronizer mechanism 789 non-rotatably locks the reverse driver gear 713 to the second input layshaft 722 by contacting the reverse driver gear 713.

The engine 701, transmission input shaft 702, first input layshaft 721 and first driver gear 711 may be coupled together in synchronous rotation by activating the first clutch mechanism 781. The engine 701, transmission input shaft 702, second input layshaft 722 and first synchronizer mechanism 789 may be coupled together in synchronous rotation by activating the second clutch mechanism 782. The transmission also includes a first driven gear 731, a second driven gear 732 and reverse driven gear 733 non-rotatably coupled to an EVT input shaft 703. The first driven gear 731 is continuously meshed with the first driver gear 711 and the second driven gear 732 is continuously meshed with the second driver gear 712. The reverse driver gear 713 is continuously meshed with a reverse idler gear 714 which is continuously meshed with the reverse driven gear 733. The gearing ratios of the first driver gear 711/first driven gear 731 ("first input gear ratio"), second driver gear 712/second driven gear 732 ("second input gear ratio") and reverse driver gear 713/reverse driven gear 733 ("reverse/third input gear ratio") can be selected to any desired under/overdrive ratio for each gear range.

The carrier 744 is also coupled to the EVT input shaft 703. The input-split planetary gear set 705 is a conventional planetary gear set as would be readily understood by one of ordinary skill in the art and includes a sun gear 741, a plurality of pinion gears 742 and a ring gear 743. The pinion gears 742 are rotatably mounted on the carrier 744. Each pinion gear 742 is continuously meshed with the sun gear 741 and the ring gear 743. The sun gear 741 is non-rotatably coupled by a shaft 752 to electric motor A 791 ("EMA"). The ring gear 743 is non-rotatably coupled to a third clutch mechanism 783 and a fourth clutch mechanism 784 by a shaft 754. The third clutch mechanism 783 selectively non-rotatably couples the ring gear 743 and shaft 754 to the transmission housing 793. When activated, the third clutch mechanism 783 locks the ring gear 743 and shaft 754 to the transmission housing 793 and prevents rotation of the ring gear 743 and shaft 754. The fourth clutch mechanism 784 selectively non-rotatably couples the ring gear 743 to electric motor B 792 ("EMB") by a shaft 753. EMB 792 is permanently coupled to shaft 753, which couples EMB 792 to an output gear 734. When activated, the fourth clutch mechanism 784 non-rotatably couples the ring gear 743 and shaft 754 to EMB 792, shaft 753 and output gear 734. The output gear 734 is continuously meshed a final drive output 735 that distributes propulsive force from the CI-EVT.

FIG. 8 is a table listing the operating modes and corresponding clutch activation states of the compound-input electrically variable transmission of FIG. 7. The first clutch mechanism 781 ("C1"), second clutch mechanism 782 ("C2"), third clutch mechanism 783 ("C3"), and fourth clutch mechanism 784 ("C4") may be selectively activated to achieve the different operating states of the CI-EVT. "On" indicates that the clutch has been activated, thereby coupling together all components to which it is coupled. "Off" indicates that the clutch has been deactivated, thereby allowing the components to which it is coupled to rotate independent of one another. The CI-EVT may be operated in a variety of modes including as a hybrid electric vehicle ("HEV"), plug-in hybrid electric vehicle ("PHEV"), range-extended electric vehicle ("ReEV") and pure battery electric vehicle ("BEV").

Referring to FIGS. 7 and 8, when the CI-EVT is to be operated in a HEV with a combination of propulsive force from the engine 701 and EMB 792 with EMA 791 generating electrical power, the third clutch mechanism 783 is deactivated and the fourth clutch mechanism 784 is activated. Thus, propulsive force passes from the engine 701 and through shaft 702 to the first clutch mechanism 781 and second clutch mechanism 782. At this point, for operation of the CI-EVT in a HEV in a first gear ratio ("HEV 1"), the first clutch mechanism 781 is activated and the second clutch mechanism 782 is deactivated. Thus, propulsive force passes through the first clutch mechanism 781, first input layshaft 721, first driver gear 711, first driven gear 731 and to the EVT input shaft 703. For operation of the CI-EVT in a HEV in a second gear ratio ("HEV 2"), the first clutch mechanism 781 is deactivated and the second clutch mechanism 782 is activated. In addition, the synchronizer mechanism 789 is moved longitudinally along the second input layshaft 722 and into contact with the second driver gear 712, thereby non-rotatably coupling the second driver gear 712 to the second input layshaft 722. Thus, propulsive force passes through the second clutch mechanism 782, second input layshaft 722, synchronizer mechanism 789, second driver gear 712, second driven gear 732 and to the EVT input shaft 703. For operation of the CI-EVT in a HEV in a reverse/third gear ratio, the first clutch mechanism 781 is deactivated and the second clutch mechanism 782 is activated. In addition, the synchronizer mechanism 789 is moved longitudinally along the second input layshaft 722 and into contact with the reverse driver gear 713, thereby non-rotatably coupling the reverse driver gear 713 to the second input layshaft 722. Thus, propulsive force passes through the second clutch mechanism 782, second input layshaft 722, synchronizer mechanism 789, reverse driver gear 713, reverse idler gear 714, reverse driven gear 732 and to the EVT input shaft 703. From the EVT input shaft 703, when operating in the first gear ratio, second gear ratio, and reverse/third gear ratio, propulsive force passes to the carrier 744 of the input-split planetary gear set 705. Propulsive force passes through the input-split planetary gear set 705 to the shaft 754 and fourth clutch mechanism 784. At the fourth clutch mechanism 784, EMB 792 supplements the propulsive force from the engine 701 and the propulsive force passes through shaft 753 the output gear 734, and on to the final drive output 735.

Still referring to FIGS. 7 and 8, the CI-EVT may also be configured for use in a ReEV. In a ReEV, the propulsive force for the vehicle is typically provided by electric motors using energy supplied by a battery. When the battery becomes depleted, a gasoline or other fuel powered engine typically is engaged to provide propulsive force and/or electrical power to power the electric motor. When the CI-EVT is to be operated in a ReEV as a BEV with only EMB 792 providing propulsive force ("ReEV as BEV 1") utilizing only battery power, the first clutch mechanism 781, second clutch mechanism 782, third clutch mechanism 583 and fourth clutch mechanism 584 are all deactivated. In effect, the CI-EVT becomes a one-speed battery powered transmission. In this configuration, propulsive force is provided solely by EMB 792 and travels through shaft 753, output gear 734, and on to the final drive output 735. For operation of the CI-EVT in reverse, EMB 792 simply rotates in the opposite direction.

When used in a ReEV and operating in a BEV mode, the CI-EVT may also be configured such that both EMA 791 and EMB 792 provide propulsive force with no assistance from the engine 701 ("ReEV as BEV 2"). In this configuration, the first clutch mechanism 781, second clutch mechanism 782 and fourth clutch mechanism 784 are activated and the third clutch mechanism 783 is deactivated. The activation of the first clutch mechanism 781 and second clutch mechanism 782 simultaneously effectively locks the EVT input shaft 703 in place, thereby preventing it and the carrier 744 of the input split planetary gear set 705 from rotating. Thus, propulsive force travels from EMA 791 through the sun gear 741, pinion gears 742, ring gear 743, and clutch 784. EMB 792 then supplements the propulsive force of EMA 791 and the combined propulsive force travels through shaft 753 to the output gear 734, and on to the final drive output 735. For operation of the CI-EVT in a ReEV in reverse utilizing both EMA 791 and EMB 792, EMA 791 and EMB 792 simply rotate in a direction opposite to that in which they rotated for forward propulsion.

The CI-EVT used in a ReEV operating in a BEV mode may also be supplied with propulsive force exclusively by EMB 792 while EMA 791 operates in a speed control mode to maintain zero RPM for the EVT input shaft 703, transmission input shaft 702 and engine 701. For operation in this mode, the third clutch mechanism 783 is deactivated and the fourth clutch mechanism 784 is activated. In this mode of operation, EMB 792 provides propulsive force to the shaft 753 which then transmits the propulsive force to the output gear 734. The output gear 734 powers the final drive output 735. The fourth clutch mechanism 784 and shaft 754 couple EMB 792 to the ring gear 743 of the input-split planetary gear set 705. Thus, propulsive force is also transferred to the ring gear 743 causing the input-split planetary gear set 705 to rotate. EMA 791, operating in a speed control mode, is powered to cause the sun gear 741 to rotate at a RPM that prevents the EVT input shaft 703, transmission input shaft 702 and engine 701 from rotating. For operation in this mode, the first clutch mechanism 781 may be activated and the second clutch mechanism 782 may be deactivated ("ReEV as BEV 3a") or the first clutch mechanism 781 may be deactivated and the second clutch mechanism 782 may be activated ("ReEV as BEV 3b").

The CI-EVT may also be configured for use in a series ReEV in which the engine 701 rotates EMA 791 in order to generate electrical power to power EMB 792 and provide propulsive force for the vehicle. In this configuration, there is no mechanical power path between the engine 701 and the final drive output 735. Still referring to FIGS. 7 and 8, when the CI-EVT is to be operated as a series ReEV utilizing EMA 791 as a generator and EMB 792 as the propulsion source, the third clutch mechanism 783 is activated, thereby locking the ring gear 743 to the transmission housing 793 and the fourth clutch mechanism 784 is deactivated. This activation state of the third clutch mechanism 783 and fourth clutch mechanism 784 configures the CI-EVT to utilize EMA 791 as a generator and EMB 792 as the propulsion source. The engine 701 provides the mechanical power to spin EMA 791 as a generator. Thus, propulsive force passes from the engine 701 and through shaft 702 to the first clutch mechanism 781 and second clutch mechanism 782. At this point, for operation of the CI-EVT in a series ReEV in a first gear ratio ("ReEV as SERIES 1"), the first clutch mechanism 781 is activated and the second clutch mechanism 782 is deactivated. Thus, propulsive force passes through the first clutch mechanism 781, first input layshaft 721, first driver gear 711, first driven gear 731 and to the EVT input shaft 703. For operation of the CI-EVT in a series ReEV in a second gear ratio ("ReEV as SERIES 2"), the first clutch mechanism 781 is deactivated and the second clutch mechanism 782 is activated. In addition, the synchronizer mechanism 789 is moved longitudinally along the second input layshaft 722 and into contact with the second driver gear 712, thereby non-rotatably coupling the second driver gear 712 to the second input layshaft 722. Thus, propulsive force passes through the second clutch mechanism 782, second input layshaft 722, synchronizer mechanism 789, second driver gear 712, second driven gear 732 and to the EVT input shaft 703. For operation of the CI-EVT in a series ReEV in a reverse/third gear ratio, the first clutch mechanism 781 is deactivated and the second clutch mechanism 782 is activated. In addition, the synchronizer mechanism 789 is moved longitudinally along the second input layshaft 722 and into contact with the reverse driver gear 713, thereby non-rotatably coupling the reverse driver gear 713 to the second input layshaft 722. Thus, propulsive force passes through the second clutch mechanism 782, second input layshaft 722, synchronizer mechanism 789, reverse driver gear 713, reverse idler gear 714, reverse driven gear 733 and to the EVT input shaft 703. From the EVT input shaft 703, when operating in the first gear ratio, second gear ratio, and reverse/third gear ratio, propulsive force passes to the carrier of the input-split planetary gear set 705. The sun gear 741, to which EMA 791 is affixed, is forced to rotate by the pinion gears 742 because the ring gear 743 is locked in place. Thus, EMA 791 generates electrical power to power EMB 792. Meanwhile, because the fourth clutch mechanism 784 is deactivated, EMB 792 is free to rotate independently of the ring gear 743. EMB 792 uses the electrical power provided by EMA 791 and/or a battery to apply a propulsive force to shaft 753. The propulsive force passes through the shaft 753 to the output gear 734, and on to the final drive output 735.

Still referring to FIGS. 7 and 8, the CI-EVT may be operated as a parallel ReEV ("ReEV as EVT 1" or "ReEV as EVT 2" in FIG. 8) in which both the engine 701 and EMB 792 provide propulsive force and EMA 791 generates electrical power. The clutch activation states and propulsive force flows within the CI-EVT when operated as a parallel ReEV are identical to those described with respect to operation of the CI-EVT as a HEV ("HEV 1" and "HEV 2"). In addition, it is contemplated that the CI-EVT may be used in a PHEV. As with the ReEV, the clutch activation states and propulsive power flows within the CI-EVT when operated as a PHEV are identical to those described with respect to operation of the CI-EVT as a HEV ("HEV 1" and "HEV 2"). However, when the CI-EVT is to be used in an PHEV, it may be desirable to use a higher torque and power EMB 792 than when the CI-EVT is used in a HEV.

Figure 9:
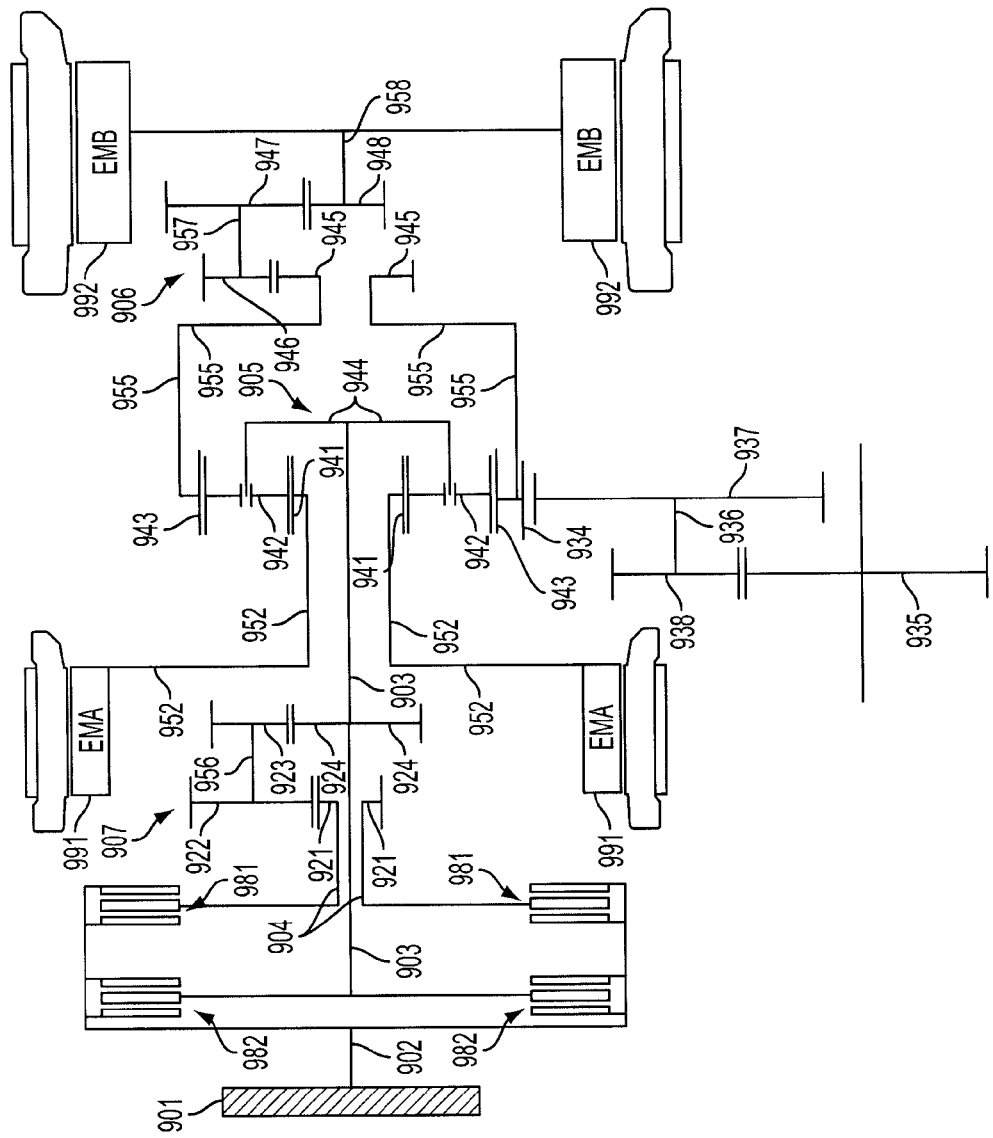
FIG. 9 illustrates an example compound-input electrically variable transmission having a multi-speed gearing mechanism incorporated between an engine and a carrier of an input-split planetary gear set according to another embodiment disclosed herein.

FIG. 9 illustrates an example compound-input electrically variable transmission ("CI-EVT") having a multi-speed gearing mechanism 907 incorporated between an engine 901 and a carrier 944 of an input-split planetary gear set 905 according to another embodiment disclosed herein. The CI-EVT includes a transmission input shaft 902 connected to engine 901. The transmission input shaft 902 is also coupled to a first clutch mechanism 981 and a second clutch mechanism 982. The first clutch mechanism 981 is selectively coupled to a first input shaft 904 that is concentric with the transmission input shaft 902. The second clutch mechanism 982 is selectively coupled to an EVT input shaft 903 that is concentric with the transmission input shaft 902 and first input shaft 904. An input layshaft driver gear 921 is non-rotatably coupled to the first input shaft 904. An input layshaft 956 is parallel to the EVT input shaft 903 and first input shaft 904. Non-rotatably coupled to the input layshaft 956 are an input layshaft driven gear 922 and an EVT input shaft driver gear 923. The input layshaft driven gear 922 is continuously meshed with the input layshaft driver gear 921. The EVT input shaft driver gear 923 is continuously meshed with an EVT input shaft driven gear 924 that is non-rotatably coupled to the EVT input shaft 903. When the first clutch mechanism 981 is activated and second clutch mechanism 982 is deactivated, the transmission input shaft 902 and first input shaft 904 are connected and rotate synchronously. When the second clutch mechanism 982 is activated and first clutch mechanism 981 is deactivated, the transmission input shaft 902 and EVT input shaft 903 are connected and rotate synchronously.

The carrier 944 is non-rotatably coupled to the EVT input shaft 903. The input-split planetary gear set 905 is a conventional planetary gear set as would be readily understood by one of ordinary skill in the art and includes a sun gear 941, a plurality of pinion gears 942 and a ring gear 943. The pinion gears 942 are rotatably mounted on the carrier 944. Each pinion gear 942 is continuously meshed with the sun gear 941 and the ring gear 943. The sun gear 941 is non-rotatably coupled by a shaft 952 to electric motor A 991 ("EMA"). The ring gear 943 is non-rotatably coupled to an EMB reduction gear set 906 by a shaft 955.

The EMB reduction gear set 906 includes an EMB layshaft driven gear 945 non-rotatably coupled to the shaft 955 and a EMB layshaft 957 parallel to the shaft 955. The EMB layshaft 957 has an EMB layshaft driver gear 946 and EMB driven gear 947 non-rotatably coupled to it. The EMB layshaft driver gear 946 is continuously meshed with the EMB layshaft driven gear 945. The EMB driven gear 947 is continuously meshed with an EMB driver gear 948 that is non-rotatably coupled by a shaft 958 to electric motor B 992 ("EMB"). Thus, EMB 992 is coupled to the ring gear 943 by the EMB reduction gear set 906. However, in one embodiment, the EMB reduction gear set 906 for EMB 992 may be omitted and EMB 992 may be coupled directly to the ring gear 943.

The ring gear 943 is also non-rotatably coupled to an output gear 934. The output gear 934 is continuously meshed an output driver gear 937. The output driver gear 937 and an output driven gear 938 are non-rotatably coupled to an output layshaft 936. The output driven gear 938 is continuously meshed with the final drive output 935 that distributes propulsive force from the CI-EVT. The output driver gear 937 and output driven gear 938 can be selected to achieve a desired final drive ratio for the CI-EVT.

The multi-speed gearing mechanism 907 of the CI-EVT of FIG. 9 may be configured for operation in several different modes. For operation of the multi-speed gearing mechanism 907 as a unity gear set in which the input RPM of the transmission input shaft 902 and output RPM of the carrier 944 are equal ("HEV w/engine on, second input gear ratio" and "HEV in EV 2b" in FIG. 4), the first clutch mechanism 981 is deactivated and the second clutch mechanism 982 is activated. Thus, the transmission input shaft 902 is non-rotatably coupled to the second clutch mechanism 982, EVT input shaft 903 and carrier 944. For operation of the multi-speed gearing mechanism 907 as an underdrive gear set in which the input RPM of the transmission input shaft 902 is greater than the output RPM of the carrier 944 ("HEV w/engine on, first input gear ratio" and "HEV in EV 2a" in FIG. 4), the first clutch mechanism 981 is activated and the second clutch mechanism 982 is deactivated. Thus, the transmission input shaft 902 is non-rotatably coupled to the first clutch mechanism 981, first input shaft 904, input layshaft driver gear 921, input layshaft driven gear 922, input layshaft 956, EVT input shaft driver gear 923, EVT input shaft driven gear 924, and then to the EVT input shaft 903 and carrier 944. For operation of the multi-speed gearing mechanism 907 as an input brake in which the carrier 944 and transmission input shaft 902 are non-rotatably locked in place ("HEV in EV1" in FIG. 4), the first clutch mechanism 981 and second clutch mechanism 982 are both activated.

Figure 10:
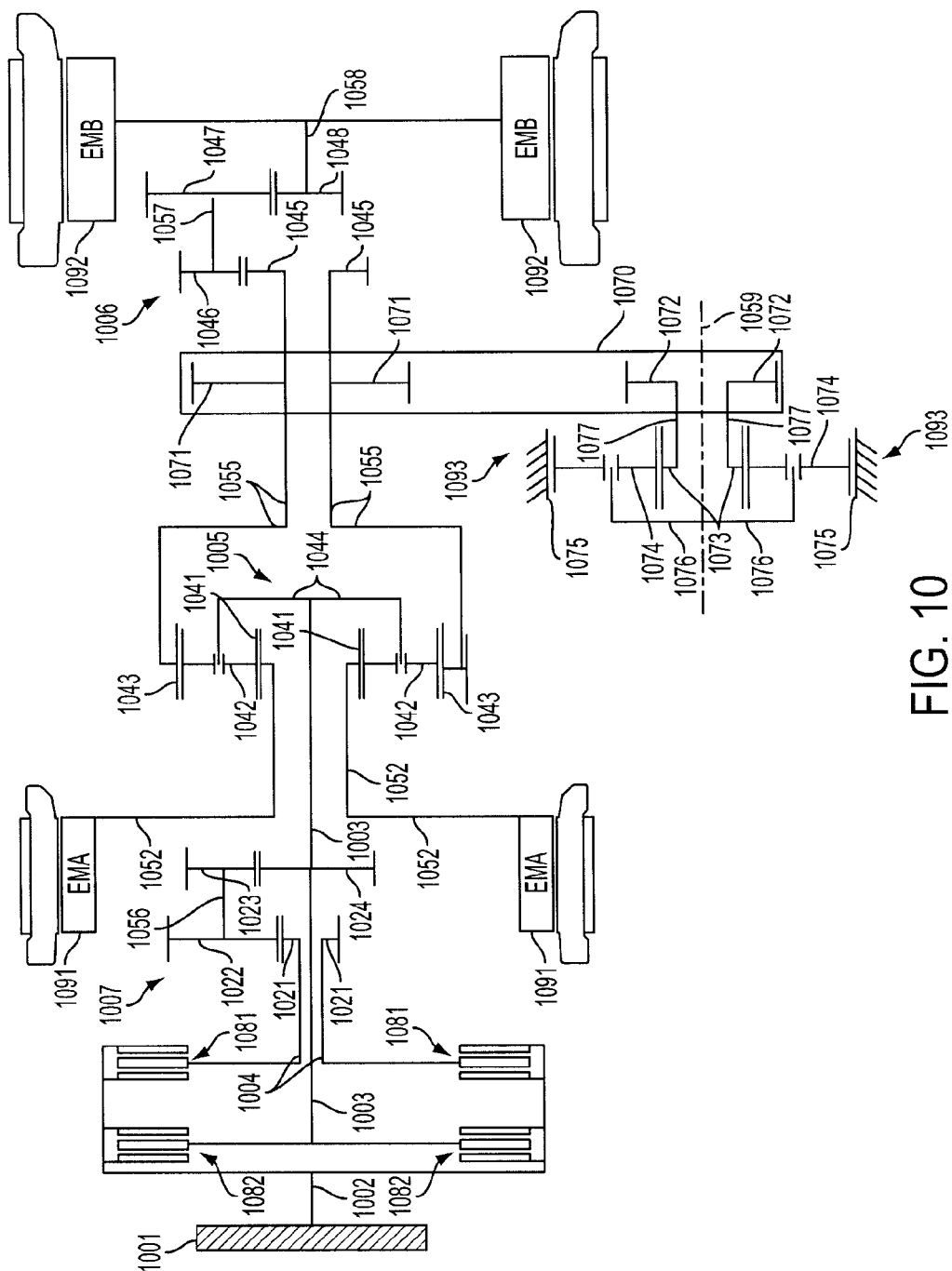
FIG. 10 illustrates an example compound-input electrically variable transmission having a multi-speed gearing mechanism incorporated between an engine and a carrier of an input-split planetary gear set according to another embodiment disclosed herein.

FIG. 10 illustrates an example compound-input electrically variable transmission ("CI-EVT") having a multi-speed gearing mechanism 1007 incorporated between an engine 1001 and a carrier 1044 of an input-split planetary gear set 1005 according to another embodiment disclosed herein. The CI-EVT includes a transmission input shaft 1002 connected to engine 1001. The transmission input shaft 1002 is also coupled to a first clutch mechanism 1081 and a second clutch mechanism 1082. The first clutch mechanism 1081 is selectively coupled to a first input shaft 1004 that is concentric with the transmission input shaft 1002. The second clutch mechanism 1082 is selectively coupled to an EVT input shaft 1003 that is concentric with the transmission input shaft 1002 and first input shaft 1004. A input layshaft driver gear 1021 is non-rotatably coupled to the first input shaft 1004. An input layshaft 1056 is parallel to the EVT input shaft 1003 and first input shaft 1004. Non-rotatably coupled to the input layshaft 1056 are an input layshaft driven gear 1022 and an EVT input shaft driver gear 1023. The input layshaft driven gear 1022 is continuously meshed with the input layshaft driver gear 1021. The EVT input shaft driver gear 1023 is continuously meshed with an EVT input shaft driven gear 1024 that is non-rotatably coupled to the EVT input shaft 1003. When the first clutch mechanism 1081 is activated and second clutch mechanism 1082 is deactivated, the transmission input shaft 1002 and first input shaft 1004 are connected and rotate synchronously. When the second clutch mechanism 1082 is activated and first clutch mechanism 1081 is deactivated, the transmission input shaft 1002 and EVT input shaft 1003 are connected and rotate synchronously.

The carrier 1044 is non-rotatably coupled to the EVT input shaft 1003. The input-split planetary gear set 1005 is a conventional planetary gear set as would be readily understood by one of ordinary skill in the art and includes a sun gear 1041, a plurality of pinion gears 1042 and a ring gear 1043. The pinion gears 1042 are rotatably mounted on the carrier 1044. Each pinion gear 1042 is continuously meshed with the sun gear 1041 and the ring gear 1043. The sun gear 1041 is non-rotatably coupled by a shaft 1052 to electric motor A 1091 ("EMA"). The ring gear 1043 is non-rotatably coupled to an EMB reduction gear set 1006 by a shaft 1055.

The EMB reduction gear set 1006 includes an EMB layshaft driven gear 1045 non-rotatably coupled to the shaft 1055 and a EMB layshaft 1057 parallel to the shaft 1055. The EMB layshaft 1057 has an EMB layshaft driver gear 1046 and EMB driven gear 1047 non-rotatably coupled to it. The EMB layshaft driver gear 1046 is continuously meshed with the EMB layshaft driven gear 1045. The EMB driven gear 1047 is continuously meshed with an EMB driver gear 1048 that is non-rotatably coupled by a shaft 1058 to electric motor B 1092 ("EMB"). Thus, EMB 1092 is coupled to the ring gear 1043 by the EMB reduction gear set 1006. However, in one embodiment, the EMB reduction gear set 1006 for EMB 1092 may be omitted and EMB 1092 may be coupled directly to the ring gear 1043.

In an embodiment, the CI-EVT may be provided with a chain or belt final drive. For instance, the ring gear 1043 may be fitted with a sprocket capable of accommodating a chain or belt. The CI-EVT may also be equipped with a geared final drive. In one embodiment, the shaft 1055 is non-rotatably coupled to a chain drive driver gear 1071. A chain or belt 1070 couples the chain drive driver gear 1071 to a chain drive driven gear 1072 non-rotatably coupled to an output layshaft 1077. The output layshaft 1077 is non-rotatably coupled to the sun gear 1073 of a planetary gear set. The ring gear 1075 of the planetary gear set is coupled to the transmission housing 1093. The carrier 1076 of the planetary gear set carriers the pinion gears 1074 and is non-rotatably coupled to the output shaft 1059.

The multi-speed gearing mechanism 1007 of the CI-EVT of FIG. 10 may be configured for operation in several different modes. For operation of the multi-speed gearing mechanism 1007 as a unity gear set in which the input RPM of the transmission input shaft 1002 and output RPM of the carrier 1044 are equal ("HEV w/engine on, second input gear ratio" and "HEV in EV 2b" in FIG. 4), the first clutch mechanism 1081 is deactivated and the second clutch mechanism 1082 is activated. Thus, the transmission input shaft 1002 is non-rotatably coupled to the second clutch mechanism 1082, EVT input shaft 1003 and carrier 1044. For operation of the multi-speed gearing mechanism 1007 as an underdrive gear set in which the input RPM of the transmission input shaft 1002 is greater than the output RPM of the carrier 1044 ("HEV w/engine on, first input gear ratio" and "HEV in EV 2a" in FIG. 4), the first clutch mechanism 1081 is activated and the second clutch mechanism 1082 is deactivated. Thus, the transmission input shaft 1002 is non-rotatably coupled to the first clutch mechanism 1081, first input shaft 1004, input layshaft driver gear 1021, input layshaft driven gear 1022, input layshaft 1056, EVT input shaft driver gear 1023, EVT input shaft driven gear 1024, and then to the EVT input shaft 1003 and carrier 1044. For operation of the multi-speed gearing mechanism 1007 as an input brake in which the carrier 1044 and transmission input shaft 1002 are non-rotatably locked in place ("HEV in EV 1" in FIG. 4), the first clutch mechanism 1081 and second clutch mechanism 1082 are both activated.

Figure 11:
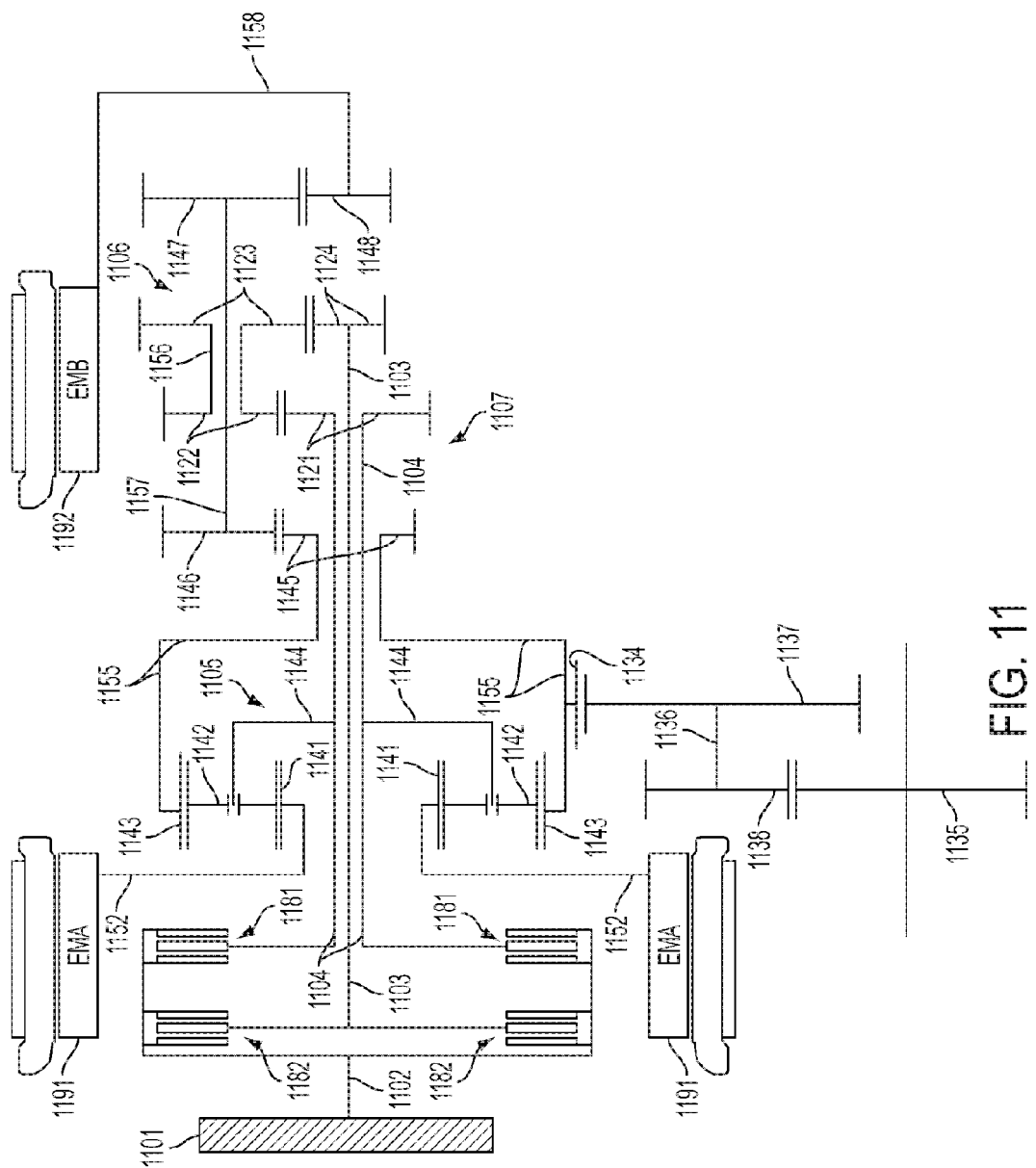
FIG. 11 illustrates an example compound-input electrically variable transmission having a multi-speed gearing mechanism incorporated between an engine and a carrier of an input-split planetary gear set according to another embodiment disclosed herein.

FIG. 11 illustrates an example compound-input electrically variable transmission ("CI-EVT") having a multi-speed gearing mechanism 1107 incorporated between an engine 1101 and a carrier 1144 of an input-split planetary gear set 1105 according to another embodiment disclosed herein. The CI-EVT includes a transmission input shaft 1102 connected to engine 1101. The transmission input shaft 1102 is also coupled to a first clutch mechanism 1181 and a second clutch mechanism 1182. The first clutch mechanism 1181 is selectively coupled to an EVT input shaft 1104 that is concentric with the transmission input shaft 1102. The second clutch mechanism 1182 is selectively coupled to a first input shaft 1103 that is concentric with the transmission input shaft 1102 and EVT input shaft 1104. An input driver gear 1121 is non-rotatably coupled to the EVT input shaft 1104. An input layshaft 1156 is parallel to the first input shaft 1103 and EVT input shaft 1104. Non-rotatably coupled to the input layshaft 1156 are an input driven gear 1122 and an EVT input shaft driver gear 1123. The input driven gear 1122 is continuously meshed with the input driver gear 1121. The input EVT input shaft driver gear 1123 is continuously meshed with an EVT input shaft driven gear 1124 that is non-rotatably coupled to the first input shaft 1103. When the first clutch mechanism 1181 is activated and second clutch mechanism 1182 is deactivated, the transmission input shaft 1102 and EVT input shaft 1104 are connected and rotate synchronously. When the second clutch mechanism 1182 is activated and first clutch mechanism 1181 is deactivated, the transmission input shaft 1102 and first input shaft 1103 are connected and rotate synchronously.

The carrier 1144 is non-rotatably coupled to the first input shaft 1103. The input-split planetary gear set 1105 is a conventional planetary gear set as would be readily understood by one of ordinary skill in the art and includes a sun gear 1141, a plurality of pinion gears 1142 and a ring gear 1143. The pinion gears 1142 are rotatably mounted on the carrier 1144. Each pinion gear 1142 is continuously meshed with the sun gear 1141 and the ring gear 1143. The sun gear 1141 is non-rotatably coupled by a shaft 1152 to electric motor A 1191 ("EMA"). The ring gear 1143 is non-rotatably coupled to a shaft 1155. The shaft 1155 is non-rotatably coupled to an EMB reduction gear set 1106 which is, in turn, non-rotatably coupled to electric motor B ("EMB") by a shaft 1158.

The EMB reduction gear set 1106 includes an EMB layshaft driven gear 1145 non-rotatably coupled to the shaft 1155 and an EMB layshaft 1157 parallel to the shaft 1155. The EMB layshaft 1157 has an EMB layshaft driver gear 1146 and EMB driven gear 1147 non-rotatably coupled to it. The EMB layshaft driver gear 1146 is continuously meshed with the EMB layshaft driven gear 1145. The EMB driven gear 1147 is continuously meshed with an EMB driver gear 1148 that is non-rotatably coupled by a shaft 1158 to EMB 1192. Thus, EMB 1192 is coupled to the ring gear 1143 by the EMB reduction gear set 1106, shaft 1158 and shaft 1155. However, in one embodiment, the EMB reduction gear set 1106 for EMB 1192 may be omitted and EMB 1192 may be coupled directly to the ring gear 1143.

The ring gear 1143 is also non-rotatably coupled to an output gear 1134. The output gear 1134 is continuously meshed an output driver gear 1137. The output driver gear 1137 and an output driven gear 1138 are non-rotatably coupled to an output layshaft 1136. The output driven gear 1138 is continuously meshed with the final drive output 1135 that distributes propulsive force from the transmission. The output driver gear 1137 and output driven gear 1138 can be selected to achieve a desired final drive ratio for the CI-EVT.

The multi-speed gearing mechanism 1107 of the CI-EVT of FIG. 11 may be configured for operation in several different modes. For operation of the multi-speed gearing mechanism 1107 as a unity gear set in which the input RPM of the transmission input shaft 1102 and output RPM of the carrier 1144 are equal ("HEV w/engine on, first input gear ratio" and "HEV in EV 2a" in FIG. 4), the first clutch mechanism 1181 is activated and the second clutch mechanism 1182 is deactivated. Thus, the transmission input shaft 1102 is non-rotatably coupled to the first clutch mechanism 1181, EVT input shaft 1104 and carrier 1144. For operation of the multi-speed gearing mechanism 1107 as an underdrive gear set in which the input RPM of the transmission input shaft 1102 is greater than the output RPM of the carrier 1144 ("HEV w/engine on, second input gear ratio" and "HEV in EV 2b" in FIG. 4), the first clutch mechanism 1181 is deactivated and the second clutch mechanism 1182 is activated. Thus, the transmission input shaft 1102 is non-rotatably coupled to the second clutch mechanism 1182, first input shaft 1103, EVT input shaft driven gear 1124, EVT input shaft driver gear 1123, input driven gear 1122, input driver gear 1121, and then EVT input shaft 1104 and carrier 1144. For operation of the multi-speed gearing mechanism 1107 as an input brake in which the carrier 1144 and transmission input shaft 1102 are non-rotatably locked in place ("HEV in EV1" in FIG. 4), the first clutch mechanism 1181 and second clutch mechanism 1182 are both activated.

Figure 12:
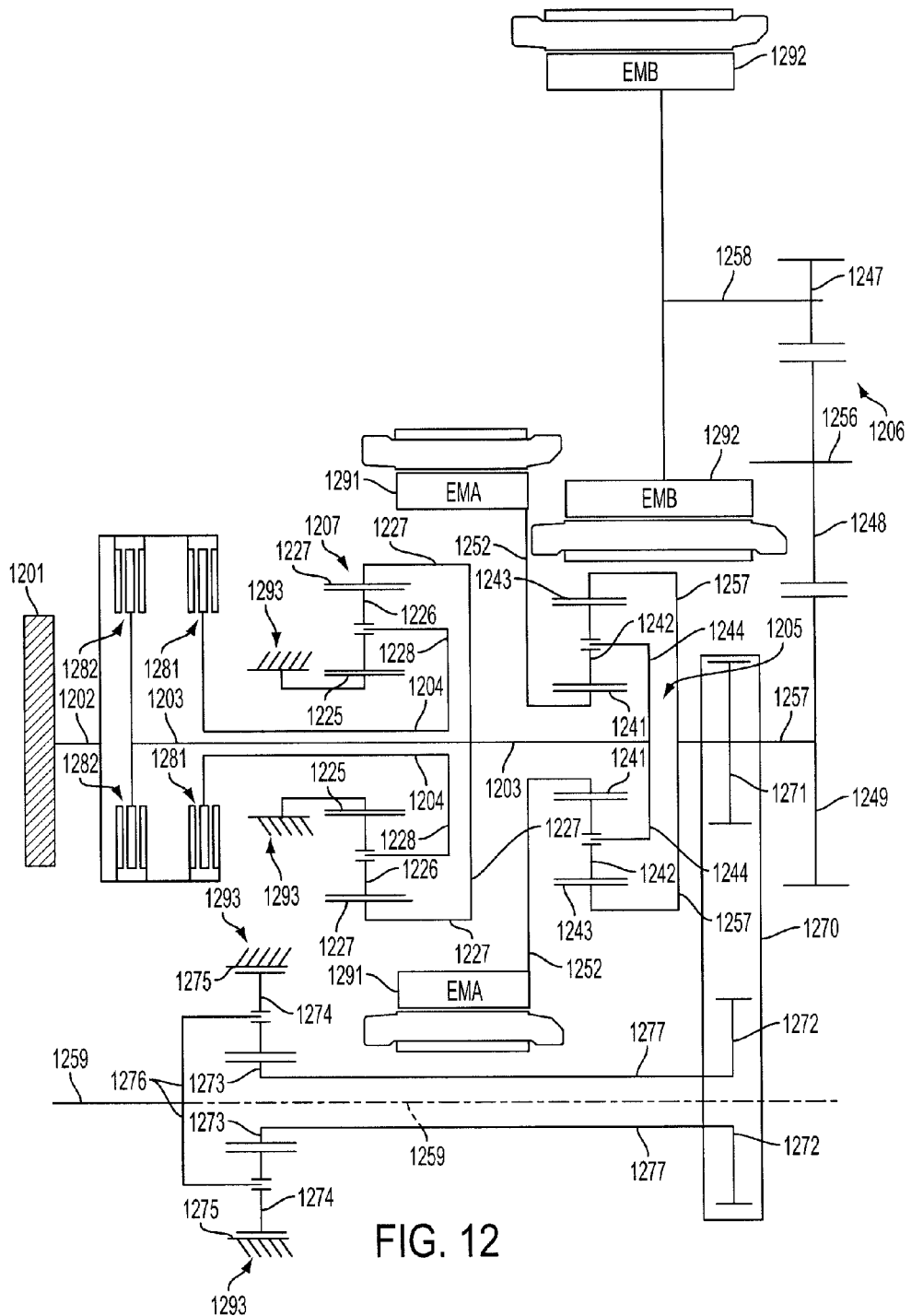
FIG. 12 illustrates an example compound-input electrically variable transmission having a multi-speed gearing mechanism incorporated between an engine and a carrier of the input-split planetary gear set according to another embodiment disclosed herein.

FIG. 12 illustrates an example compound-input electrically variable transmission ("CI-EVT") having a multi-speed gearing mechanism 1207 incorporated between an engine 1201 and a carrier 1244 of an input-split planetary gear set 1205 according to another embodiment disclosed herein. The CI-EVT includes a transmission input shaft 1202 connected to engine 1201. The transmission input shaft 1202 is also coupled to a first clutch mechanism 1281 and a second clutch mechanism 1282. The first clutch mechanism 1281 is selectively coupled to a first input shaft 1204 that is concentric with the transmission input shaft 1202. The second clutch mechanism 1282 is selectively coupled to an EVT input shaft 1203 that is concentric with the transmission input shaft 1202 and first input shaft 1204. The first input shaft 1204 is non-rotatably coupled to the EVT input carrier 1228 of an EVT input planetary gear set. The EVT input carrier 1228 carries a plurality of EVT input pinion gears 1226 that are continuously meshed with an EVT input ring gear 1227 and an EVT input sun gear 1225. The EVT input sun gear 1225 is non-rotatably coupled to the transmission housing 1293. The EVT input ring gear 1227 is non-rotatably coupled to EVT input shaft 1203. When the first clutch mechanism 1281 is activated and second clutch mechanism 1282 is deactivated, the transmission input shaft 1202 and first input shaft 1204 are connected and rotate synchronously. When the second clutch mechanism 1282 is activated and first clutch mechanism 1281 is deactivated, the transmission input shaft 1202 and EVT input shaft 1203 are connected and rotate synchronously.

The carrier 1244 is non-rotatably coupled to the EVT input shaft 1203. The input-split planetary gear set 1205 is a conventional planetary gear set as would be readily understood by one of ordinary skill in the art and includes a sun gear 1241, a plurality of pinion gears 1242 and a ring gear 1243. The pinion gears 1242 are rotatably mounted on the carrier 1244. Each pinion gear 1242 is continuously meshed with the sun gear 1241 and the ring gear 1243. The sun gear 1241 is non-rotatably coupled by a shaft 1252 to electric motor A 1291 ("EMA"). The ring gear 1243 is non-rotatably coupled to an EMB reduction gear set 1206 by a shaft 1257.

The EMB reduction gear set 1206 includes a third EMB gear 1249 non-rotatably coupled to shaft 1257. The third EMB gear 1249 is continuously meshed with a second EMB gear 1248 which rotates on a shaft 1256. The second EMB gear 1248 is continuously meshed with a first EMB gear 1247. A shaft 1258 non-rotatably couples the first EMB gear 1247 to electric motor B 1292 ("EMB"). Thus, EMB 1292 is coupled to the ring gear 1243 by the EMB reduction gear set 1206 and shaft 1257. However, in one embodiment, the EMB reduction gear set 1206 for EMB 1292 may be omitted and EMB 1292 may be coupled directly to the ring gear 1243.

The shaft 1257 is non-rotatably coupled to a chain drive driver gear 1271. A chain or belt 1270 couples the chain drive driver gear 1271 to a chain drive driven gear 1272 non-rotatably coupled to an output layshaft 1277. The output layshaft 1277 is non-rotatably coupled to the sun gear 1273 of a planetary gear set. The ring gear 1275 of the planetary gear set is coupled to the transmission housing 1293. The carrier 1276 of the planetary gear set carries the pinion gears 1274 and is non-rotatably coupled to an output shaft 1259. In one embodiment, the transmission may be equipped with a geared final drive in place of a belt and/or chain 1270. In another embodiment, the ring gear 1243 may be directly fitted with a sprocket capable of accommodating a belt and/or chain 1270.

The multi-speed gearing mechanism 1207 of the CI-EVT of FIG. 12 may be configured for operation in several different modes. For operation of the multi-speed gearing mechanism 1207 as a unity gear set in which the input RPM of the transmission input shaft 1202 and output RPM of the carrier 1244 are equal ("HEV w/engine on, second input gear ratio" and "HEV in EV 2b" in FIG. 4), the first clutch mechanism 1281 is deactivated and the second clutch mechanism 1282 is activated. Thus, the transmission input shaft 1202 is non-rotatably coupled to the second clutch mechanism 1282, EVT input shaft 1203 and carrier 1244. For operation of the multi-speed gearing mechanism 1207 as an overdrive gear set in which the output RPM of the carrier 1244 is greater than the input RPM of the transmission input shaft 1202 ("HEV w/engine on, first input gear ratio" and "HEV in EV 2a" in FIG. 4), the first clutch mechanism 1281 is activated and the second clutch mechanism 1282 is deactivated. Thus, the transmission input shaft 1202 is non-rotatably coupled to the first input shaft 1204, and EVT input carrier 1228. The EVT input sun gear 1225 is non-rotatably locked in place to the transmission housing 1293. Thus, the EVT input carrier 1228 causes the EVT input pinion gears 1226 to rotate, thereby causing the EVT input ring gear 1227, EVT input shaft 1203 and carrier 1244 to rotate at greater RPM than the transmission input shaft 1202. For operation of the multi-speed gearing mechanism 1207 as an input brake in which the carrier 1244 and transmission input shaft 1202 are non-rotatably locked in place ("HEV in EV1" in FIG. 4), the first clutch mechanism 1281 and second clutch mechanism 1282 are both activated.

Figure 13:
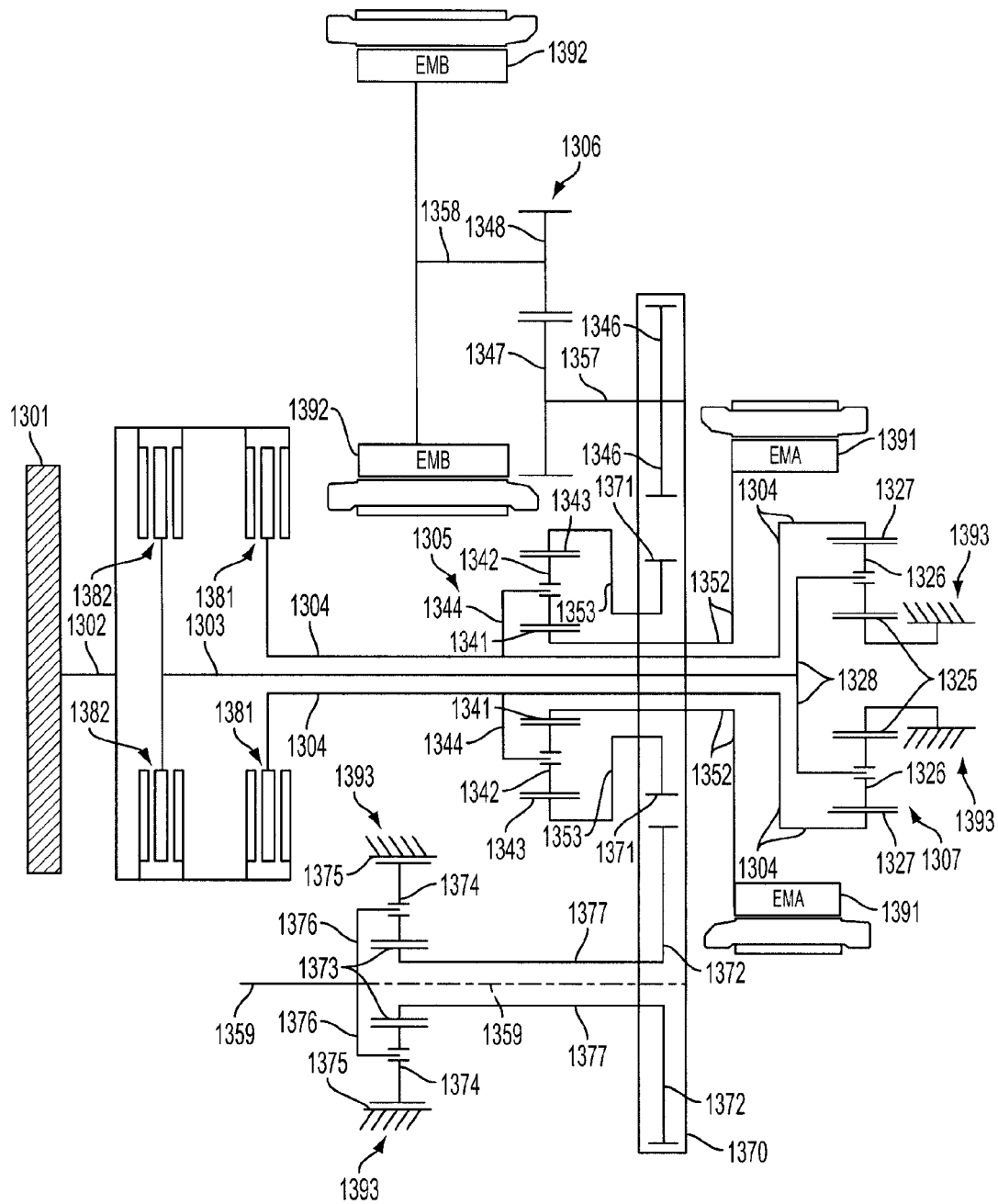
FIG. 13 illustrates an example compound-input electrically variable transmission having a multi-speed gearing mechanism incorporated between an engine and a carrier of an input-split planetary gear set according to another embodiment disclosed herein.

FIG. 13 illustrates an example compound-input electrically variable transmission ("CI-EVT") having a multi-speed gearing mechanism 1307 incorporated between an engine 1301 and a carrier 1344 of an input-split planetary gear set 1305 according to another embodiment disclosed herein. The CI-EVT includes a transmission input shaft 1302 connected to engine 1301. The transmission input shaft 1302 is also coupled to a first clutch mechanism 1381 and a second clutch mechanism 1382. The first clutch mechanism 1381 is selectively coupled to an EVT input shaft 1304 that is concentric with the transmission input shaft 1302. The second clutch mechanism 1382 is selectively coupled to a first input shaft 1303 that is concentric with the transmission input shaft 1302 and EVT input shaft 1304. The EVT input shaft 1304 is non-rotatably coupled to the EVT input ring gear 1327 of an EVT input planetary gear set. The first input shaft 1303 is non-rotatably coupled to the EVT input carrier 1328 that carries a plurality of EVT input pinion gears 1326 that are continuously meshed with an EVT input ring gear 1327 and an EVT input sun gear 1325. The EVT input sun gear 1325 is non-rotatably coupled to the transmission housing 1393. When the first clutch mechanism 1381 is activated and second clutch mechanism 1382 is deactivated, the transmission input shaft 1302 and EVT input shaft 1304 are connected and rotate synchronously. When the second clutch mechanism 1382 is activated and first clutch mechanism 1381 is deactivated, the transmission input shaft 1302 and first input shaft 1303 are connected and rotate synchronously.

The carrier 1344 is non-rotatably coupled to the EVT input shaft 1304. The input-split planetary gear set 1305 is a conventional planetary gear set as would be readily understood by one of ordinary skill in the art and includes a sun gear 1341, a plurality of pinion gears 1342 and a ring gear 1343. The pinion gears 1342 are rotatably mounted on the carrier 1344. Each pinion gear 1342 is continuously meshed with the sun gear 1341 and the ring gear 1343. The sun gear 1341 is non-rotatably coupled by a shaft 1352 to electric motor A 1391 ("EMA"). The ring gear 1343 is non-rotatably coupled by a shaft 1353 to a chain drive driver gear 1371.

The transmission also includes electric motor B 1392 ("EMB") coupled to an EMB reduction gear set 1306. The EMB reduction gear set 1306 includes a shaft 1358 that non-rotatably couples EMB 1392 to an EMB driver gear 1348. The EMB driver gear 1348 is continuously meshed with a EMB driven gear 1347. The EMB driven gear 1347 and an EMB chain drive driver gear 1346 are non-rotatably coupled to an EMB layshaft 1357. A belt and/or chain 1370 couples the EMB chain drive driver gear 1346, chain drive driver gear 1371 and a chain drive driven gear 1372 into rotation with one another.

The chain drive driven gear 1372 is non-rotatably coupled to an output layshaft 1377. The output layshaft 1377 is non-rotatably coupled to the sun gear 1373 of a planetary gear set. The ring gear 1375 of the planetary gear set is coupled to the transmission housing 1393. The carrier 1376 of the planetary gear set carries the pinion gears 1374 and is non-rotatably coupled to an output shaft 1359. In one embodiment, the transmission may also be equipped with a geared final drive in place of a belt and/or chain 1370. For instance, the ring gear 1343 may be fitted with a sprocket capable of accommodating a belt and/or chain 1370.

The multi-speed gearing mechanism 1307 of the CI-EVT of FIG. 13 may be configured for operation in several different modes. For operation of the multi-speed gearing mechanism 1307 as a unity gear set in which the input RPM of the transmission input shaft 1302 and output RPM of the carrier 1344 are equal ("HEV w/engine on, first input gear ratio" and "HEV in EV 2a" in FIG. 4), the first clutch mechanism 1381 is activated and the second clutch mechanism 1382 is deactivated. Thus, the transmission input shaft 1302 is non-rotatably coupled to the first clutch mechanism 1381, EVT input shaft 1304 and carrier 1344. For operation of the multi-speed gearing mechanism 1307 as an overdrive gear set in which the output RPM of the carrier 1344 is greater than the input RPM of the transmission input shaft 1302 ("HEV w/engine on, second input gear ratio" and "HEV in EV 2b" in FIG. 4), the first clutch mechanism 1381 is deactivated and the second clutch mechanism 1382 is activated. Thus, the transmission input shaft 1302 is non-rotatably coupled to the first input shaft 1303, and EVT input carrier 1328. The EVT input sun gear 1325 is non-rotatably locked in place to the transmission housing 1393. Thus, the EVT input carrier 1328 causes the EVT input pinion gears 1326 to rotate, thereby causing the EVT input ring gear 1327, EVT input shaft 1304 and carrier 1344 to rotate at greater RPM than the transmission input shaft 1302. For operation of the multi-speed gearing mechanism 1307 as an input brake in which the carrier 1344 and transmission input shaft 1302 are non-rotatably locked in place ("HEV in EV1" in FIG. 4), the first clutch mechanism 1381 and second clutch mechanism 1382 are both activated.

Figure 14:
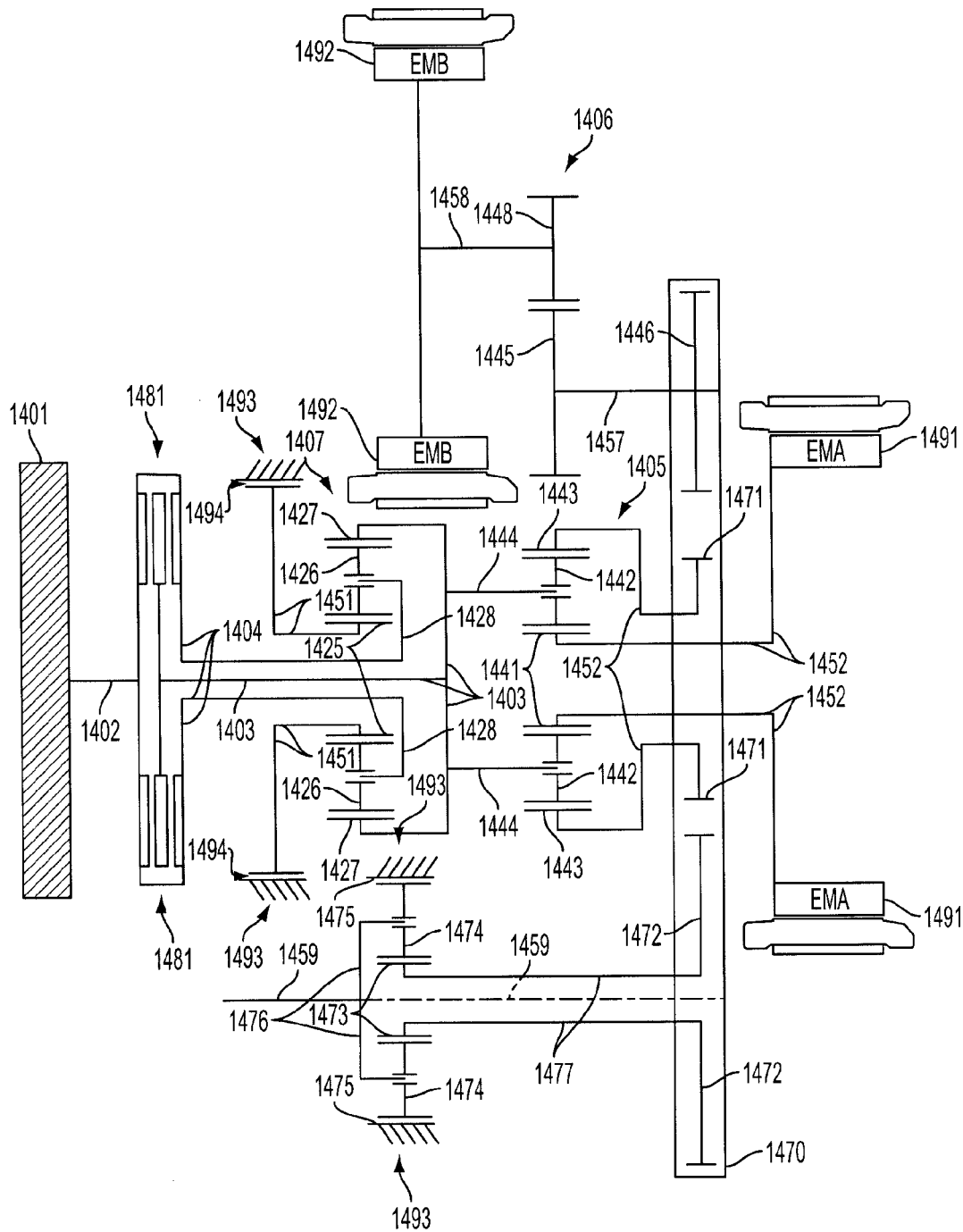
FIG. 14 illustrates an example compound-input electrically variable transmission having a multi-speed gearing mechanism incorporated between an engine and a carrier of an input-split planetary gear set according to another embodiment disclosed herein.

FIG. 14 illustrates an example compound-input electrically variable transmission ("CI-EVT") having a multi-speed gearing mechanism 1407 incorporated between an engine 1401 and a carrier 1444 of an input-split planetary gear set 1405 according to another embodiment disclosed herein. The CI-EVT includes a transmission input shaft 1402 connected to engine 1401. The transmission input shaft 1402 is also coupled to a first clutch mechanism 1481. The first clutch mechanism 1481 is selectively coupled to an EVT input shaft 1403 that is concentric with the transmission input shaft 1402. The EVT input shaft 1403 is non-rotatably coupled to an EVT input ring gear 1427 of an EVT input planetary gear set. The transmission input shaft 1402 is non-rotatably coupled to a first input shaft 1404. The first input shaft 1404 is non-rotatably coupled to an EVT input carrier 1428 that carries a plurality of EVT input pinion gears 1426 that are continuously meshed with the EVT input ring gear 1427 and an EVT input sun gear 1425. The EVT input sun gear 1425 is selectively non-rotatably coupled to the transmission housing 1493 by a brake mechanism 1494. The brake mechanism 1494 may be any type of braking or other suitable clutching mechanism. When the first clutch mechanism 1481 is activated, the transmission input shaft 1402 and EVT input shaft 1403 are connected and rotate synchronously. When the first clutch mechanism 1481 is deactivated, the transmission input shaft 1402 and EVT input shaft 1403 are disconnected and rotate independently. When the brake mechanism 1494 is activated, the EVT input sun gear 1425 is prevented from rotating. The EVT input sun gear 1425 is free to rotate when the brake mechanism 1494 is deactivated.

The carrier 1444 is non-rotatably coupled to the EVT input shaft 1403. The input-split planetary gear set 1405 is a conventional planetary gear set as would be readily understood by one of ordinary skill in the art and includes a sun gear 1441, a plurality of pinion gears 1442 and a ring gear 1443. The pinion gears 1442 are rotatably mounted on the carrier 1444. Each pinion gear 1442 is continuously meshed with the sun gear 1441 and ring gear 1443. The sun gear 1441 is non-rotatably coupled by a shaft 1452 to electric motor A 1491 ("EMA"). The ring gear 1443 is non-rotatably coupled by a shaft 1453 to a chain drive driver gear 1471.

The transmission also includes electric motor B 1492 ("EMB") coupled to an EMB reduction gear set 1406. The EMB reduction gear set 1406 includes a shaft 1458 that non-rotatably couples EMB 1492 to an EMB driver gear 1448. The EMB driver gear 1448 is continuously meshed with a EMB driven gear 1447. The EMB driven gear 1447 and a EMB chain drive driver gear 1446 are non-rotatably coupled to an EMB layshaft 1457. A belt and/or chain 1470 couples the EMB chain drive driver gear 1446, chain drive driver gear 1471 and a chain drive driven gear 1472 into rotation with one another.

The chain drive driven gear 1472 is non-rotatably coupled to an output layshaft 1477. The output layshaft 1477 is non-rotatably coupled to the sun gear 1473 of a planetary gear set. The ring gear 1475 of the planetary gear set is coupled to the transmission housing 1493. The carrier 1476 of the planetary gear set carries the pinion gears 1474 and is non-rotatably coupled to an output shaft 1459. In one embodiment, the transmission may also be equipped with a geared final drive in place of a belt and/or chain 1470.

The multi-speed gearing mechanism 1407 of the CI-EVT of FIG. 14 may be configured for operation in several different modes. For operation of the multi-speed gearing mechanism 1407 as a unity gear set in which the input RPM of the transmission input shaft 1402 and output RPM of the carrier 1444 are equal ("HEV w/engine on, first input gear ratio" and "HEV in EV 2a" in FIG. 4), the first clutch mechanism 1481 is activated and the brake mechanism 1494 is deactivated. Thus, the transmission input shaft 1402 is non-rotatably coupled to the first clutch mechanism 1481, EVT input shaft 1403, EVT input ring gear 1427 and carrier 1444. The EVT input sun gear 1425 is left to freely rotate. For operation of the multi-speed gearing mechanism 1407 as an overdrive gear set in which the output RPM of the carrier 1444 is greater than the input RPM of the transmission input shaft 1402 ("HEV w/engine on, second input gear ratio" and "HEV in EV 2b" in FIG. 4), the first clutch mechanism 1481 is deactivated and the brake mechanism 1494 is activated. Thus, the transmission input shaft 1402 is non-rotatably coupled to the first input shaft 1404, and EVT input carrier 1428. The EVT input sun gear 1425 is non-rotatably locked in place by the brake mechanism 1494. Thus, the EVT input carrier 1428 causes the EVT input pinion gears 1426 to rotate, thereby causing the EVT input ring gear 1427 and carrier 1444 to rotate at greater RPM than the transmission input shaft 1402. For operation of the multi-speed gearing mechanism 1407 as an input brake in which the carrier 1444 and transmission input shaft 1402 are non-rotatably locked in place ("HEV in EV1" in FIG. 4), the first clutch mechanism 1481 and brake mechanism 1494 are both activated.

Figure 15:
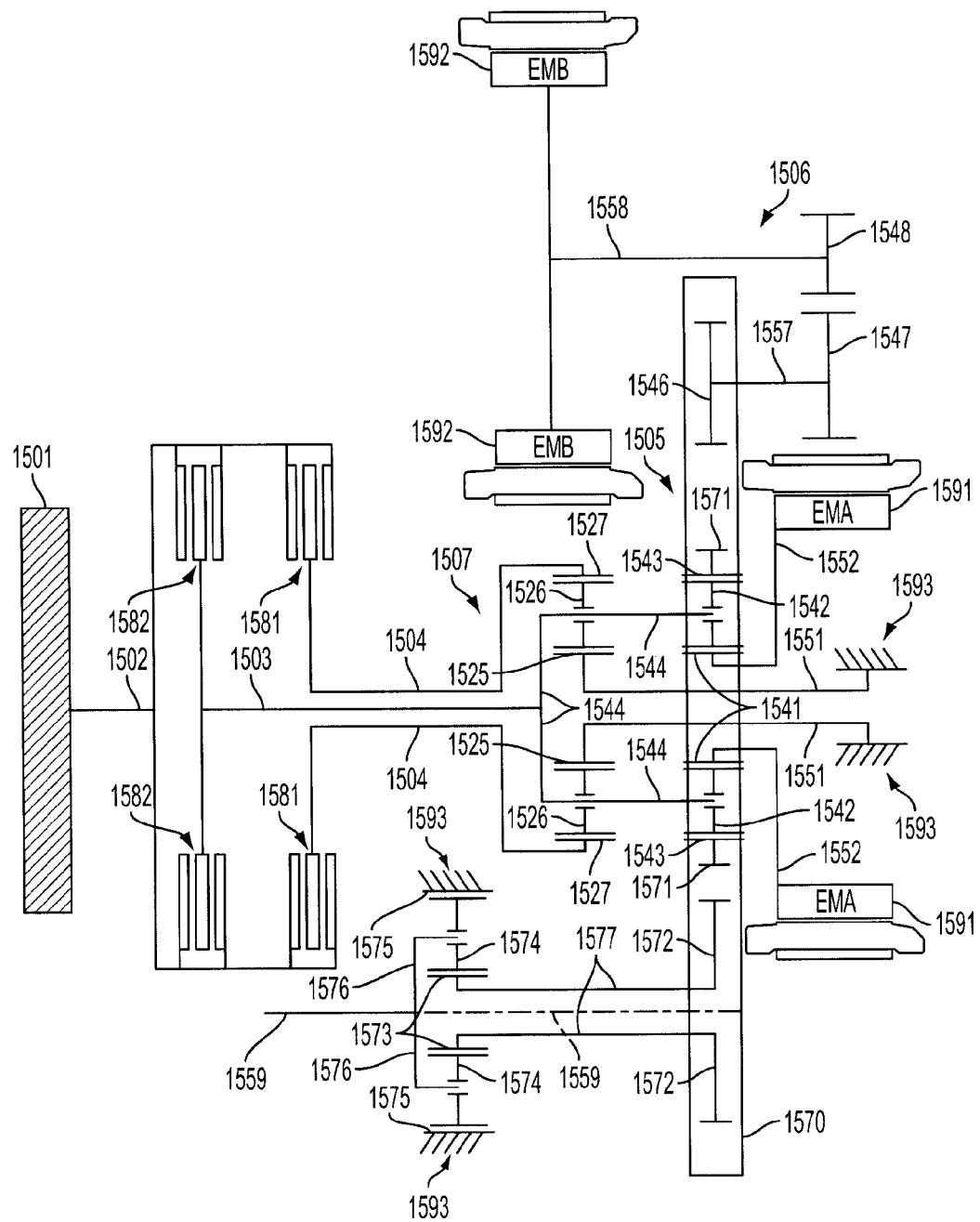
FIG. 15 illustrates an example compound-input electrically variable transmission having a multi-speed gearing mechanism incorporated between an engine and a carrier of an input-split planetary gear set according to another embodiment disclosed herein.

FIG. 15 illustrates an example compound-input electrically variable transmission ("CI-EVT") having a multi-speed gearing mechanism 1507 incorporated between an engine 1501 and a carrier 1544 of an input-split planetary gear set 1505 according to another embodiment disclosed herein. The CI-EVT includes a transmission input shaft 1502 connected to engine 1501. The transmission input shaft 1502 is also coupled to a first clutch mechanism 1581 and a second clutch mechanism 1582. The first clutch mechanism 1581 is selectively coupled to a first input shaft 1504 that is concentric with the transmission input shaft 1502. The second clutch mechanism 1582 is selectively coupled to a second input shaft 1503 that is concentric with the transmission input shaft 1502 and first input shaft 1504. The first input shaft 1504 is non-rotatably coupled to an EVT input ring gear 1527 of an EVT input planetary gear set 1507. The second input shaft 1503 is non-rotatably coupled to the carrier 1544 that carries a plurality of EVT input pinion gears 1526 that are continuously meshed with an EVT input ring gear 1527 and an EVT input sun gear 1525. The EVT input sun gear 1525 is non-rotatably coupled by a shaft 1551 to the transmission housing 1593. When the first clutch mechanism 1581 is activated and second clutch mechanism 1582 is deactivated, the transmission input shaft 1502, first input shaft 1504 and the EVT ring gear 1527 are connected and rotate synchronously. When the second clutch mechanism 1582 is activated and first clutch mechanism 1581 is deactivated, the transmission input shaft 1502 and second input shaft 1503 are connected and rotate synchronously.

The carrier 1544 is also the carrier 1544 of an input-split planetary gear set 1505. In this way, the carrier 1544 acts as an EVT input shaft for the input-split planetary gear set 1505. In one embodiment, the carrier 1544 of the EVT input planetary gear set of the multi-speed gearing mechanism 1507 and the carrier 1544 of the input-split planetary gear set 1505 may be different carriers that are non-rotatably coupled to one another. The input-split planetary gear set 1505 is a conventional planetary gear set as would be readily understood by one of ordinary skill in the art and includes a sun gear 1541, a plurality of pinion gears 1542 and a ring gear 1543. The pinion gears 1542 are rotatably mounted on the carrier 1544. Each pinion gear 1542 is continuously meshed with the sun gear 1541 and the ring gear 1543. The sun gear 1541 is non-rotatably coupled by a shaft 1552 to electric motor A 1591 ("EMA"). The ring gear 1543 is non-rotatably coupled to a chain drive driver gear 1571.

The CI-EVT also includes electric motor B 1592 ("EMB") coupled to an EMB reduction gear set 1506. The EMB reduction gear set 1506 includes a shaft 1558 that non-rotatably couples EMB 1592 to an EMB driver gear 1548. The EMB driver gear 1548 is continuously meshed with an EMB driven gear 1547. The EMB driven gear 1547 and an EMB chain drive driver gear 1546 are non-rotatably coupled to an EMB layshaft 1557. A belt and/or chain 1570 couples the EMB chain drive driver gear 1546, chain drive driver gear 1571 and a chain drive driven gear 1572 into rotation with one another.

The chain drive driven gear 1572 is non-rotatably coupled to an output layshaft 1577. The output layshaft 1577 is non-rotatably coupled to the sun gear 1573 of a planetary gear set. The ring gear 1575 of the planetary gear set is coupled to the transmission housing 1593. The carrier 1576 of the planetary gear set carries the pinion gears 1574 and is non-rotatably coupled to the output shaft 1559. In one embodiment, the transmission may also be equipped with a geared final drive in place of a belt and/or chain 1570.

The multi-speed gearing mechanism 1507 of the CI-EVT of FIG. 15 may be configured for operation in several different modes. For operation of the multi-speed gearing mechanism 1507 as an underdrive gear set in which the input RPM of the transmission input shaft 1502 is greater than the output RPM of the carrier 1544 ("HEV w/engine on, first input gear ratio" and "HEV in EV 2a" in FIG. 4), the first clutch mechanism 1581 is activated and the second clutch mechanism 1582 is deactivated. Thus, the transmission input shaft 1502 is non-rotatably coupled to the first clutch mechanism 1581, first input shaft 1504, and EVT input ring gear 1527. The EVT input sun gear 1525 is non-rotatably coupled to the transmission housing 1593. Thus, the EVT input pinion gears 1526 which are mounted on the carrier 1544 are caused to rotate thereby rotating the carrier 1544 at an RPM less than that of the transmission input shaft 1502. For operation of the multi-speed gearing mechanism 1507 as a unity gear set in which the input RPM of the transmission input shaft 1502 and output RPM of the carrier 1544 are equal ("HEV w/engine on, second input gear ratio" and "HEV in EV 2b" in FIG. 4), the first clutch mechanism 1581 is deactivated and the second clutch mechanism 1582 is activated. Thus, the transmission input shaft 1502 is non-rotatably coupled to the second clutch mechanism 1582, second input shaft 1503, and carrier 1544 causing each to rotate at identical RPM. For operation of the multi-speed gearing mechanism 1507 as an input brake in which the carrier 1544 and transmission input shaft 1502 are non-rotatably locked in place ("HEV in EV1" in FIG. 4), the first clutch mechanism 1581 and brake mechanism 1594 are both activated.

While the disclosed CI-EVTs of FIGS. 2, 5-7, and 9-15 are shown with two forward gear ratios and, in some embodiments, a reverse/third gear ratio, the CI-EVT is not so limited. Any number of forward and/or reverse gear ratios and corresponding clutches and synchronizer mechanisms may be included within the CI-EVT as desired. In one embodiment, a continuously variable transmission may be configured between the transmission input shaft and electrically variable transmission input shaft, thereby providing a nearly infinite number of gear ratios. The gear ratios and corresponding final drive ratios may be selected to be any desired underdrive or overdrive ratio as would be readily apparent to one of skill in the art to achieve the desired engine efficiency, power band and/or vehicle performance. In addition, any type of clutching mechanism or arrangement may be utilized within the CI-EVT as would be known to one of skill in the art. For instance, the CI-EVT may utilize dry clutches, wet clutches, multi-plate clutches, dog clutches, synchronizer mechanisms, dual clutches as found in a conventional dry dual clutch transmission, or any other known clutching mechanism to achieve the disclosed clutching action. The clutching mechanisms may be located on the first and second input layshafts, the EVT input shaft, or any combination of the three. Further, planetary gear sets may be used in place of the layshaft arrangement. For example, referring to FIG. 2, the first driver gear 11/first driven gear 21 combination may be replaced by a first planetary gear set and the second driver gear 12/second driven gear 22 may be replaced by a second planetary gear set.

Further, while the disclosed CI-EVTs of FIGS. 2, 5-7, and 9-15 are shown with the multi-speed gearing mechanism coupled to an input-split EVT, the multi-speed gearing mechanism is not so limited. Rather, the multi-speed gearing mechanism may be coupled to the electrically variable transmission input shaft of any type of EVT. For instance, the multi-speed gearing mechanism may be coupled to the electrically variable transmission input shaft of compound-split EVT, output-split EVT, or any other type of EVT.

Thus, because the input ratio of the disclosed CI-EVT may be changed by selectively activating or deactivating the first clutch mechanism and second clutch mechanism, the CI-EVT may be operated more efficiency while achieving better vehicle performance. In addition, the multi-speed input ratio of the CI-EVT allows for more effective and efficient engine starting when utilizing electric motor A. In one embodiment, the first clutch mechanism and second clutch mechanism are deactivated while electric motor A is powered to start the engine. Subsequently, one of the first clutch mechanism or second clutch mechanism is activated and the rotational inertia of electric motor A is used to start the vehicle engine. Further, because the CI-EVT includes an integrated input brake, the CI-EVT may utilize both electric motor A and electric motor B for both forward and reverse electric vehicle operation with reduced system losses and improved propulsive force. The CI-EVT may also be equipped with a reverse gear and idler system that allows engine propulsive force to supplement the propulsive force provided by electric motors A and B when the CI-EVT is operated in reverse. The CI-EVT may also be equipped for hybrid electric vehicle and plug-in hybrid electric vehicle use. The CI-EVT is also capable of range-extended electric vehicle and pure battery electric vehicle use with the addition of the third clutch mechanism and fourth clutch mechanism to the EVT. It should also be understood that while the specification refers to an electric motor B reduction gear set, the electric motor B reduction gear set need not be reduction gearing for the output of electric motor B. Instead, the electric motor B reduction gear set may increase the output ratio of electric motor B or achieve any other desired output gear ratio for electric motor B.

One advantage of the disclosed embodiments is that an improved planetary gear set configuration is provided for the CI-EVT. Thus, the CI-EVT may be operated in its desired efficiency and/or performance range more frequently. Further, the transmission allows for more efficient and powerful electric vehicle operation. The CI-EVT is provided with a multi-speed input device that allows for improved engine starting in difficult starting conditions. The CI-EVT is capable of hybrid electric vehicle, plug-in hybrid electric vehicle, range-extended electric vehicle and pure battery electric vehicle operation.

Although this technology has been illustrated and described herein with reference to preferred embodiments and specific examples thereof, it will be readily apparent to those of ordinary skill in the art that other embodiments and examples can perform similar functions and/or achieve like results. All such equivalent embodiments and examples are within the spirit and scope of the technology and are intended to be covered by the following claims.

What is claimed is:

1. An electrically variable transmission comprising:
   a transmission input shaft;
   an electrically variable transmission input shaft;
   a planetary gear set;
   a first clutch mechanism; and
   a second clutch mechanism,
   wherein the transmission input shaft is selectively coupled using the first clutch mechanism to the electrically variable transmission input shaft to provide a first input gear ratio, and the transmission input shaft is selectively coupled using the first clutch mechanism to the electrically variable transmission input shaft to provide a second input gear ratio, and
   wherein the second clutch mechanism is configured to selectively couple the transmission housing to the planetary gear set.

2. The electrically variable transmission of claim 1:
   wherein the planetary gear set is coupled to the electrically variable transmission input shaft and comprises:
   a sun gear,
   at least two pinion gears continuously meshed with the sun gear,
   a carrier coupled to the at least two pinion gears, and
   a ring gear continuously meshed with the at least two pinion gears;
   and further comprising:
   a first electric motor coupled to the planetary gear set; and
   a second electric motor coupled to planetary gear set.

3. The electrically variable transmission of claim 2, wherein:
   the carrier is coupled to the electrically variable transmission input shaft;
   the sun gear is coupled to the first electric motor; and
   the ring gear is coupled to second electric motor.

4. The electrically variable transmission of claim 1, wherein the first input gear ratio and the second input gear ratio are provided by a continuously variable transmission.

5. A transmission comprising:
a first carrier of a first planetary gear set,
the first planetary gear set comprising:
  a first sun gear,
  at least two first pinion gears continuously meshed with the first sun gear, and
  a first ring gear continuously meshed with the at least two first pinion gears;
a first electric motor coupled to the first sun gear;
a second electric motor coupled to the first ring gear;
a second planetary gear set coupled to the first the first planetary gear set and comprising:
  a second sun gear,
  at least two second pinion gears continuously meshed with the second sun gear, and
  a second ring gear continuously meshed with the at least two second pinion gears, and
first and second clutch mechanisms coupled to the second planetary gear set, wherein the first clutch mechanism selectively couples the second planetary gear set to provide a first input gear ratio to the first planetary gear set and the second clutch mechanism selectively couples the second planetary gear set to provide a second input gear ratio to the first planetary gear set,
and further wherein the at least two second pinion gears are rotatably mounted to the first carrier.

6. A transmission comprising:
a first planetary gear set comprising:
  a first sun gear,
  at least two first pinion gears continuously meshed with the first sun gear, and
  a first ring gear continuously meshed with the at least two first pinion gears;
a first electric motor coupled to the first sun gear;
a second electric motor coupled to the first ring gear;
a second planetary gear set coupled to the first the first planetary gear set and comprising:
  a second sun gear,
  at least two second pinion gears continuously meshed with the second sun gear, and
  a second ring gear continuously meshed with the at least two second pinion gears, and
  first and second clutch mechanisms coupled to the second planetary gear set,
wherein the first clutch mechanism selectively couples the second planetary gear set to provide a first input gear ratio to the first planetary gear set and the second clutch mechanism selectively couples the second planetary gear set to provide a second input gear ratio to the first planetary gear set, and
wherein the first clutch mechanism selectively couples the second ring gear to the transmission input shaft and the second clutch mechanism selectively couples the second sun gear to the transmission housing.

\* \* \* \* \*